(12) United States Patent
Muniraju et al.

(10) Patent No.: US 12,423,458 B2
(45) Date of Patent: Sep. 23, 2025

(54) AGGREGATION OF POLICY INFORMATION FOR PRINCIPALS ASSOCIATED WITH A FILE SYSTEM

(71) Applicant: Rubrik, Inc., Palo Alto, CA (US)

(72) Inventors: Muraliraja Muniraju, Fremont, CA (US); Mudit Malpani, Sunnyvale, CA (US); Fabiano Botelho, Pleasanton, CA (US); Nandish Kotadia, Bangalore (IN); Akhil Singh, Bangalore (IN); Adam Gee, Palo Alto, CA (US)

(73) Assignee: Rubrik, Inc., Palo Alto, CA (US)

( * ) Notice: Subject to any disclaimer, the term of this patent is extended or adjusted under 35 U.S.C. 154(b) by 155 days.

(21) Appl. No.: 18/502,625

(22) Filed: Nov. 6, 2023

(65) Prior Publication Data

US 2025/0148121 A1 May 8, 2025

(51) Int. Cl.
*G06F 21/00* (2013.01)
*G06F 16/11* (2019.01)
*G06F 21/62* (2013.01)

(52) U.S. Cl.
CPC ........ *G06F 21/6227* (2013.01); *G06F 16/128* (2019.01)

(58) Field of Classification Search
None
See application file for complete search history.

(56) References Cited

U.S. PATENT DOCUMENTS

| | | | |
|---|---|---|---|
| 7,991,791 B1 * | 8/2011 | Chen | G06F 11/1435 707/787 |
| 10,922,007 B2 * | 2/2021 | Rathi | G06F 3/065 |
| 11,003,787 B2 * | 5/2021 | Sion | G06F 16/178 |
| 11,157,451 B2 * | 10/2021 | Moldvai | H04L 51/08 |
| 2020/0409796 A1 * | 12/2020 | Terei | G06Q 10/107 |

* cited by examiner

*Primary Examiner* — Maung T Lwin
(74) *Attorney, Agent, or Firm* — Holland & Hart LLP

(57) ABSTRACT

Methods, systems, and devices for data management are described. A data management system (DMS) may obtain a snapshot of a file system that includes multiple files and permission sets associated with the files. A permission set may indicate one or more access approvals for associated principals. The DMS may scan the files to identify unique pairs each including a unique combination of a respective permission set and a respective sensitive information type. The DMS may store a first mapping that maps the unique pairs to respective values that indicate an amount of sensitive information, of the respective sensitive information type, that is included in one or more files associated with the unique pair. The DMS may identify a respective set of sensitive data types included in files to which a principal has access based on the first mapping and an evaluation of the permission sets.

20 Claims, 11 Drawing Sheets

505

| Second Mapping |||| 
|---|---|---|---|
| Principal | Sensitive Data Type | Hit Count | File Count |
| P1 | Type 1 | 55 | 4 |
| P1 | Type 2 | 45 | 3 |
| P1 | Type 3 | 15 | 1 |
| P2 | Type 1 | 40 | 2 |
| P2 | Type 2 | 35 | 2 |
| ... | ... | ... | ... |

AGGREGATION OF POLICY INFORMATION FOR PRINCIPALS ASSOCIATED WITH A FILE SYSTEM

FIELD OF TECHNOLOGY

The present disclosure relates generally to data management, including techniques for aggregation of policy information for principals associated with a file system.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIG. 5 shows an example of a mapping scheme that supports aggregation of policy information for principals associated with a file system in accordance with aspects of the present disclosure.

DETAILED DESCRIPTION

Figure 1:
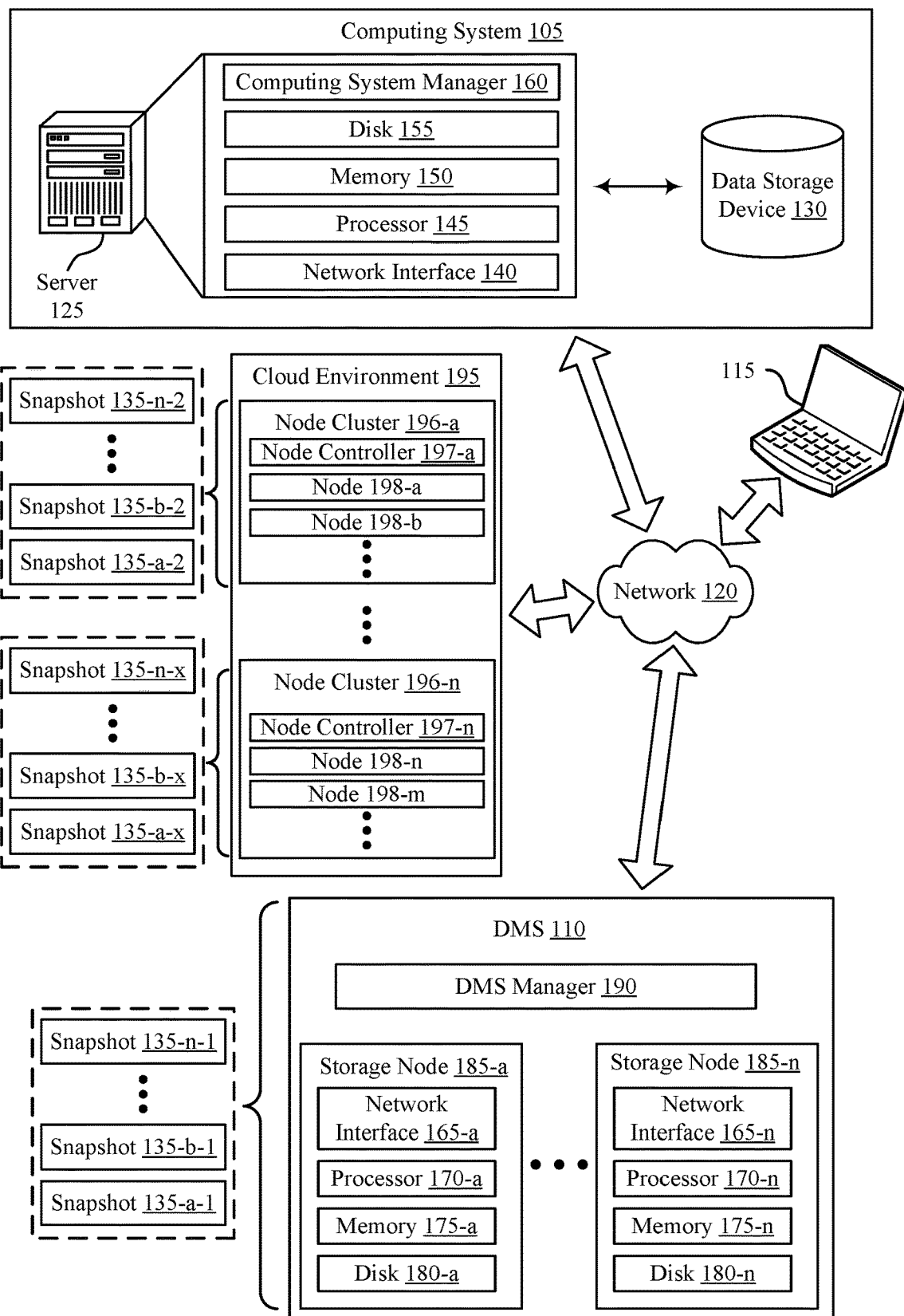
FIG. 1 illustrates an example of a computing environment that supports aggregation of policy information for principals associated with a file system in accordance with aspects of the present disclosure.

A data management system (DMS) may manage backup and recovery of data for a client. To back up a file system of the client, the DMS may obtain a snapshot of the file system. The DMS may index the file system to determine which files include various types of information and the files to which certain principals have access. A principal may represent any entity in a hierarchical structure of entities associated with the file system. For example, a principal may be an individual user, a group of users, a role within a system, one or more other entities within a hierarchy, or any combination thereof that has access to one or more portions of the file system. A group that is a principal may be a direct group of users or may be a group of multiple other groups (e.g., a group may be of subgroups). An identity management system (IMS) may manage access to the file system for one or more types of principals, and the types of principals may vary across different IMSs, different file systems, or both—it is to be understood that the teachings herein may be applied to systems involving any types of principles, and the specific types of principles mentioned herein are merely examples.

Indexed information as described herein may be used by the DMS, by the client, or both to assess a risk associated with the file system. Such techniques may be used, for example, to determine which users have access to sensitive data within the customer's system. Sensitive data may represent an example of any type of data that the customer may monitor or track access to, such as personally identifiable information (PII), personal medical information (e.g., health insurance portability and accountability act (HIPAA) data), or other sensitive or high risk data. In some examples, the snapshot may indicate policy information associated with each file. The policy information may indicate a type of sensitive information in the file and an amount of sensitive information of the sensitive information type that is included in the file. Techniques for aggregating the policy information across multiple principals may provide for the DMS, the client, or both to determine which types of sensitive information and the amount of such sensitive information to which various principals have access, among other possible uses.

Techniques, systems, and devices described herein provide for a DMS to leverage one or more permissions associated with the file system to index the file system with a relatively low complexity and processing. For a snapshot of a file system, each file subject to the snapshot is associated with a respective security descriptor, which may include a set of one or more permissions for access to the file. The permissions may be generated by humans. As such, a quantity of permissions may be relatively small as compared with quantities of principals and files in the file system. In some examples, a set of one or more permissions may be represented by an access control list (ACL), which may be referred to as a discretionary ACL (DACL), in some examples herein. Each ACL may indicate a set of one or more principals that have permission to access the file. ACLs are just one example of a permission set: generally, a permission set may be any information entity that indicates which principals do or do not have access to a particular file or set of files within a file system or object store.

The DMS may obtain a snapshot of the file system and scan a content table included in the snapshot to identify policy information for each file of the file system. The policy information for a given file may be associated with one or more types of sensitive information that are included in the file. The files may also each be associated with a respective permission set, where a permission set may include one or more permissions that indicate principals that are permitted to access the respective file. The DMS may identify a set of unique permission set and type of sensitive information pairs (e.g., (permission set 1, sensitive information type 1), (permission set 1, sensitive information type 2), . . . , etc.). For each unique pair of a permission set and a type of sensitive information, the DMS may generate an entry in a mapping table that maps the unique pair to a corresponding value (e.g., hit count) representative of an amount of sensitive information associated with the pair (e.g., an amount of information included in files assigned to the permission set that include the corresponding type of sensitive information).

The DMS may increment the value in the mapping table entry for each file that is associated with the same unique sensitive information type-permission set pair. After generating the mapping table between unique sensitive information type-permission set pairs and values, the DMS may evaluate the permission sets to identify which principals are included in each permission set. The DMS may utilize the mapping between unique sensitive information type-permission set pairs and values to generate a second mapping table that maps each principal to a corresponding set of types of sensitive information and counts. The DMS may thereby aggregate policy information per user. The DMS may output this information to a client, and the aggregated information may be used to improve security by modifying user and/or group-level access to various types of sensitive information.

FIG. 1 illustrates an example of a computing environment 100 that supports aggregation of policy information for principals associated with a file system in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a file system, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150), the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or databases, virtual machines, or file systems within the computing system 105), the DMS manager 190) may transmit a snapshot request to the computing system manager 160. In response to the snapshot request, the computing system manager 160) may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In some examples, the DMS 110 may index a snapshot 135 of a file system to determine which files include various types of information and the files to which certain principals have access. A principal may represent any entity in a hierarchical structure of entities associated with the file system. For example, a principal may be an individual user, a group of users, a role within a system, one or more other entities or policies within a hierarchy, or any combination thereof that has access to at least a portion of the file system. A group that is a principal may be a direct group of users or may be a group of multiple other groups (e.g., subgroups). The indexed information may be used by the DMS 110, by the client, or both to assess a risk associated with the file system. Such techniques may be used, for example, to determine which users have access to sensitive data within the customer's system. Sensitive data may represent an example of any type of data that the customer may monitor or track access to, such as PII, personal medical information, or other sensitive or high risk data. In some examples, the snapshot 135 may indicate policy information associated with each file. The policy information may indicate a type of sensitive information in the file and an amount of sensitive information of the sensitive information type that is included in the file. Techniques for aggregating the policy information across multiple principals may provide for the DMS 110, the client, or both to determine which types of sensitive information and the amount of such sensitive information to which various principals have access, among other possible uses.

As described herein, after obtaining a snapshot 135 of a file system, the DMS 110 may scan a content table included in the snapshot 135 to identify policy information for each file of the file system. The policy information for a given file may be associated with one or more types of sensitive information that are included in the file. The files may also each be associated with a respective permission set, where a permission set may include one or more permissions that indicate principals that are permitted to access the respective file. The DMS 110 may identify a set of unique permission set and type of sensitive information pairs (e.g., (permission set 1, sensitive information type 1), (permission set 1, sensitive information type 2), . . . , etc.). For each unique pair of a permission set and a type of sensitive information, the DMS 110 may generate an entry in a mapping table that maps the unique pair to a corresponding value (e.g., hit count) representative of an amount of sensitive information associated with the pair (e.g., an amount of information included in files assigned to the permission set that include the corresponding type of sensitive information).

The DMS 110 may increment the value in the mapping table entry for each file that is associated with the same unique sensitive information type-permission set pair. After generating the mapping table between unique sensitive information type-ACL list pairs and values, the DMS 110 may evaluate the permission sets to identify which principals are included in each permission set. The DMS 110 may utilize the mapping between unique sensitive information type-permission set pairs and values to generate a second mapping table that maps each principal to a corresponding set of types of sensitive information and counts. The DMS 110 may thereby aggregate policy information per user. The DMS 110 may output this information to a client, and the aggregated information may be used to improve security by modifying user and/or group-level access to various types of sensitive information.

Figure 2:
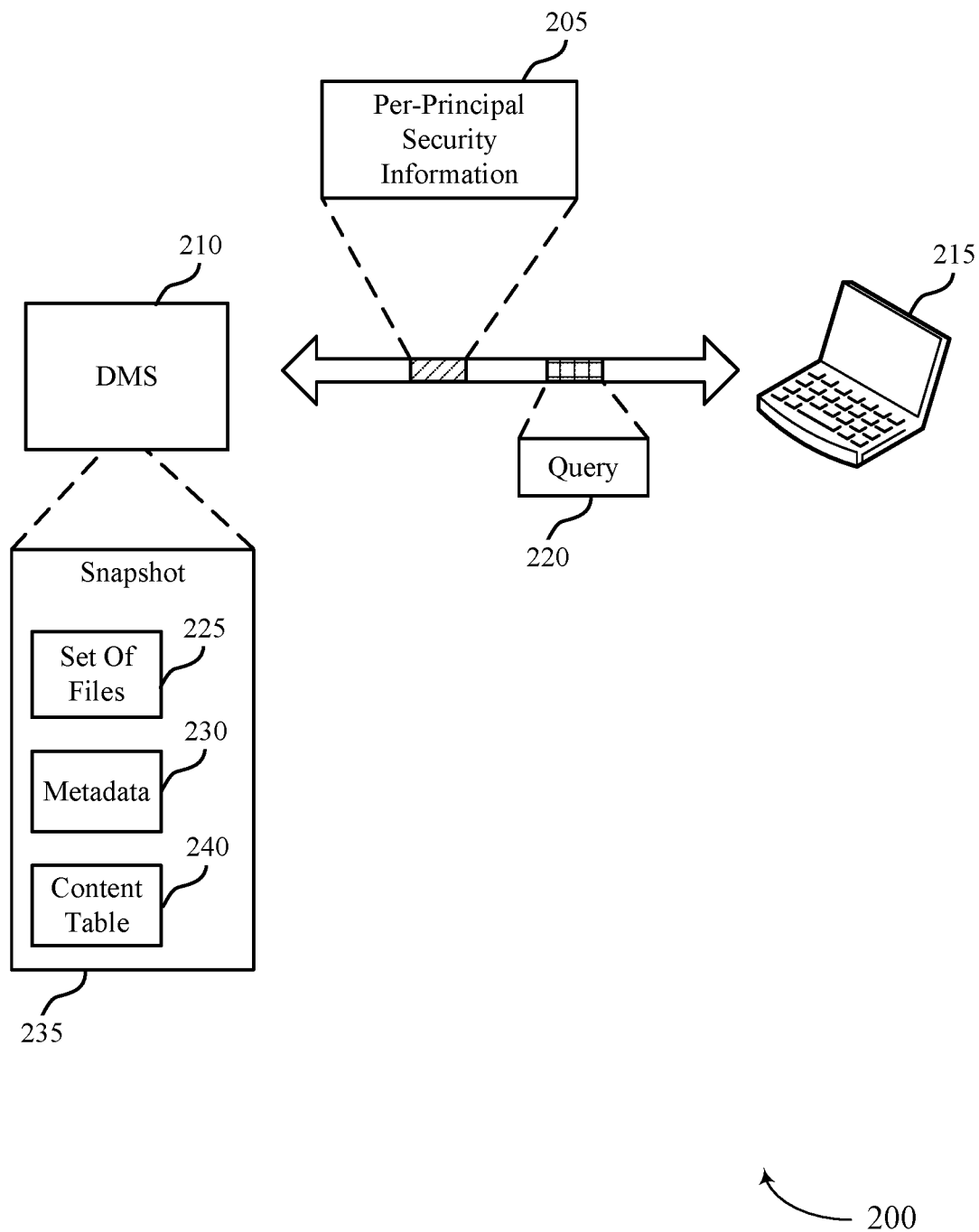
FIG. 2 shows an example of a computing environment that supports aggregation of policy information for principals associated with a file system in accordance with aspects of the present disclosure.

FIG. 2 shows an example of a computing environment 200 that supports aggregation of policy information for principals associated with a file system in accordance with aspects of the present disclosure. The computing environment 200 may implement or be implemented by aspects of the computing environment 100 described with reference to FIG. 1. For example, the computing environment 200 includes a DMS 210 and a computing device 215, which may represent examples of a DMS 110 and a computing device 115 as described with reference to FIG. 1.

The DMS 210 may provide data backup and recovery services for data of a client associated with the computing device 215. The DMS 210 may obtain a snapshot 235 of a file system of the client. The snapshot 235 may be a full snapshot or an incremental snapshot (e.g., a chain of incremental snapshots), as described with reference to FIG. 1. The snapshot 235 may include a set of files 225 of the file system and metadata 230 associated with the set of files 225, which may be referred to as file metadata in some examples. The metadata 230) may include security descriptors for each file of the set of files 225. For example, the metadata 230 may include one or more permissions associated with each file in the set of files 225, as described in further detail elsewhere herein, including with reference to FIG. 3. In some examples, the snapshot 235 may include a content table 240) (e.g., a content SST). The content table 240) may include metadata associated with sensitive information included in the set of files 225, as described in further detail elsewhere herein, including with reference to FIG. 4.

After obtaining the snapshot 235, the DMS 210 may index the snapshot 235 to determine which files include various types of information and the files to which certain principals have access. A principal may be a user or a group of users that access and use the file system. The indexed information may be used by the DMS 210, a client, or both to assess a risk associated with the file system. Such techniques may be used, for example, to determine which users have access to sensitive data (e.g., PII, personal medical information, or other sensitive or high risk data) within the customer's system. In some cases, the DMS 210 may index the file system by iterating over all principals in the system, iterating over files in the system, iterating over all sensitive data classifiers, or any combination thereof. The DMS 210 may track information for a cartesian product of all principals, all unique files, and all sensitive information classifiers, which may be a relatively high cardinality problem that may be relatively complex and costly to compute. In some examples, there may be up to one million users and one million files in the set of files 225, or some other quantity, such that the DMS 210 may perform one trillion operations to index the file. The indexing operations may be further increased based on a quantity of sensitive information classifiers (e.g., types of sensitive information). Such operations may occupy hours of time and a relatively large quantity of processing resources.

As described herein, to reduce complexity associated with indexing the file system, the DMS 210 may index the file system based on permission information. permission sets may be sets of permissions for various files in the file system and may be generated by humans. As such, a quantity of permissions may be significantly less than a quantity of users and a quantity of files in the file system. By leveraging this property of the permissions, the DMS 210 may perform more efficient indexing. For example, the DMS 210 may aggregate sensitive information per unique permission set and policy information type pairs, as described in further detail elsewhere herein, including with reference to FIG. 4. The DMS 210 may subsequently iterate through the unique permission sets and identify principals that are represented by or included in each permission set, such that the DMS 210 may aggregate sensitive information per principal to generate the per-principal security information 205.

The per-principal security information 205 may include information that associates each principal in the system with respective types of sensitive information to which the principal has access. In some examples, the per-principal security information 205 may indicate an amount of each type of sensitive data to which the principal has access, a quantity of files to which the principal has access that include the sensitive information type, or both. The per-principal security information 205 may be generated and stored by the DMS 210 as a table, which may be referred to as a mapping in some examples herein. Additionally, or alternatively, the DMS 210 may identify the per-principal security information 205 for a certain principal on demand based on a first mapping between unique sensitive data type-permission set pairs and quantities of the sensitive information and based on an evaluation of the permission sets. The per-principal security information 205 is described in further detail elsewhere herein, including with reference to FIG. 5.

In some examples, the DMS 210 may receive a query 220 from the computing device 215. The query 220 may include a request for per-principal security information 205. For example, the query 220 may indicate an ID associated with one or more principals and may request for information regarding types of sensitive data to which the principals have access in the client's system. The DMS 210 may receive the query 220 and may identify the per-principal security information 205 using the first mapping and the permission set evaluations. For example, the DMS 210 may identify permission sets that include the indicated principal, and the DMS 210 may subsequently identify sensitive data types included in files that are mapped to the permission sets. Techniques for indexing the snapshot 235 to support relatively efficient identification of the per-principal security information 205 include indexing the set of files 225, principals, and policy information based on permission sets to reduce complexity, as described with reference to FIGS. 3-6.

Figure 3:
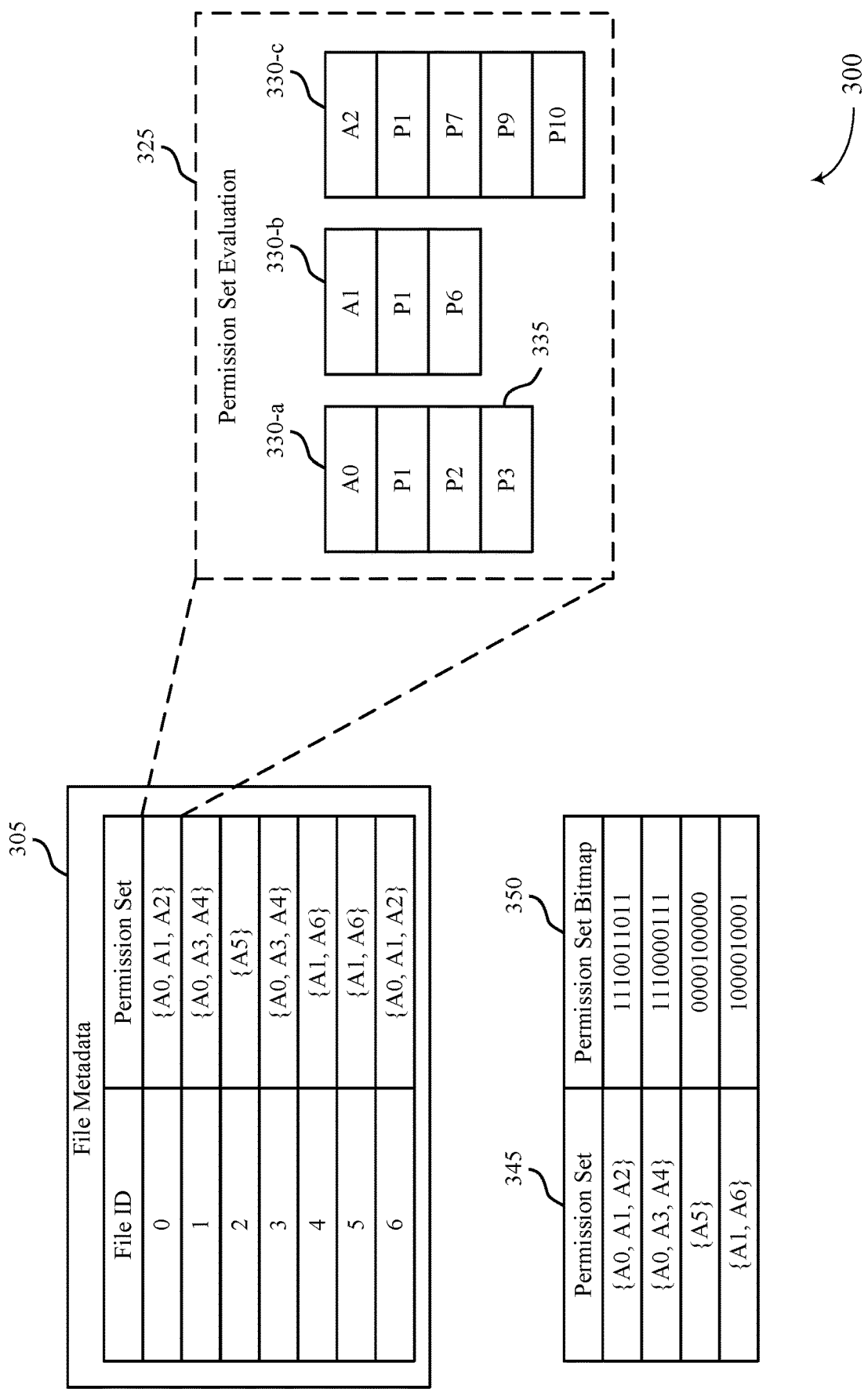
FIG. 3 shows an example of a permission evaluation scheme that supports aggregation of policy information for principals associated with a file system in accordance with aspects of the present disclosure.

FIG. 3 shows an example of a permission evaluation scheme 300 that supports aggregation of policy information for principals associated with a file system in accordance with aspects of the present disclosure. The permission evaluation scheme 300 may implement or be implemented by aspects of the computing environments 100 and 200 as described with reference to FIGS. 1 and 2. For example, the permission evaluation scheme 300 illustrates file metadata 305, which may be stored with a snapshot of a file system at a DMS. The DMS may use the permission information in the file metadata 305 to efficiently index principals and corresponding files to which the principals have access within the file system.

The DMS may obtain a snapshot of a file system, as described in further detail elsewhere herein, including with reference to FIG. 2. The snapshot may include the file metadata 305 for files in the snapshot. The file metadata 305 may include, among other types of information, security descriptors associated with the files included in the snapshot. In some examples, a file may be referred to as a path. Each security descriptor may be indexed by an ID of a file. Although the IDs in FIG. 3 are illustrated as ( ) through 6, it is to be understood that a file ID may be any quantity of bits that represent any value, including the values shown in FIG. 3 or other values not shown. Additionally, the file system may include any quantity of files. Each security descriptor may further include a set of one or more permissions 345, which may be referred to as a permission set 345 herein. The permission sets 345 may represent example DACLs, in some examples. Each permission set 345 may indicate one or more principals 335 that have access to the corresponding file. A file may be associated with a permission set 345 including a single permission 330 or multiple permissions 330.

The permissions 330) may be generated by humans (e.g., system users or engineers). As such, a unique quantity of different permissions 330 for the file system may be smaller than a quantity of principals, than a quantity of files in the file system, or both. The DMS may utilize this property of the permissions 330 to generate a two-level index of the file system. The indexing techniques described herein may provide for the DMS to efficiently index the principals and corresponding files to which the principals have access in the file system.

A first level of the index may include aggregating data metrics per unique permission set 345 retrieved from the file metadata 305. To do such per-permission set aggregation, the DMS may first evaluate each of the permission sets 345 to generate a respective permission bitmap 350 by performing a permission set evaluation 325. For example, the DMS may determine, for each permission 330, a set of one or more principals 335 that are included in the permission 330. The DMS may determine the set of one or more principals 335 via one or more permission evaluation techniques. In some examples, a permission 330 may include a sequential order of permissions and denials, and the DMS may evaluate the permission 330 according to a function to identify which principals 335 are permitted by the permission 330. Additionally, or alternatively, the DMS may utilize any other techniques for evaluating the permissions 330 to determine which principals 335 are permitted by the permissions 330. In some examples, a permission 330 may indicate a group of two or more users, and the DMS may identify the descendants of the group in order to identify a most granular set of principals 335 (e.g., users) that are included in the permission 330.

In some examples, the permission set evaluation 325 may generate a bitmap 350 associated with the permission set 345, where the bitmap 350 includes a quantity of bits that is equal to a quantity of principals 335 in the system, and each principal 335 may be mapped to a respective bit position. The bitmap 350 may include one or more bits set high in bit positions corresponding to principals 335 included in the permission set 345. In some examples, such bitmaps 350 may represent unique values that uniquely identify each permission set 345.

In the example of FIG. 3, the DMS may evaluate each of the permissions 330-a (A0), 330-b (e.g., A1), and 330-c (e.g., A2) in a first permission set 345 in the file metadata 305 (e.g., associated with the file 0 and file 6). In this example, A may represent a permission, such as a permission for a corresponding principal or set of principals to access the file. The permission 330-a may indicate that three principals 335 (e.g., P1, P2, and P3) are permitted to access a corresponding files 0 and 6. The permission 330-b may indicate that two principals (e.g., P1 and P6) are permitted to access the corresponding files 0 and 6. The permission 330-c may indicate that four principals (e.g., P1, P7, P9, and P10) are permitted to access the corresponding files 0 and 6. As such, the first permission set 345 may include (e.g., indicate permission for) seven different principals 335 (e.g., P1, P2, P3, P6, P7, P9, and P10). The permission set bitmap 350 for the first permission set 345 may be 1110011011 in this example. For example, the permission set bitmap 350 may include 10 bits to represent the 10 principals 335 in the system (e.g., P1 through P10), and bit positions associated with P1, P2, P3, P6, P7, P9, and P10 may be set high because the permission set 345 includes those principals 335. Bit positions in the permission set bitmap 350 that are associated with principals P4, P5, and P8 may be set low (e.g., to zero) because the permission set 345 may not include those principals 335.

The DMS may perform similar permission set evaluations 325 for each permission set 345. For example, a second permission set evaluation 325 for a second permission set 345 associated with the file 1 and the file 3 may indicate that the second permission set 345 includes principals P1, P2, P3, P8, P9, and P10. The permission set bitmap 350 for the second permission set 345 may be 1110000111 accordingly to represent the principals 335 that are included in the second permission set 345. In some examples, the A5 may be its own unique permission set 345 associated with the file 2. A permission set evaluation 325 for the A5 may indicate that the A5 includes (e.g., indicates permission for) a single principal P5. As such, the permission set bitmap 350 for the A5 may be 0000100000 to represent the single principal P5. Another permission set evaluation 325 for the fourth permission set 345 associated with the files 4 and 5 (e.g., A1 and A6) may indicate that the fourth permission set 345 includes principals P1, P6, and P10. The permission set bitmap 350 for the fourth permission set 345 may be 1000010001 according to represent the principals P1 and P6.

The principals 335 illustrated in FIG. 3 may be users. Additionally, or alternatively, one or more of the principals 335 may represent a group of two or more users. In such cases, the DMS may evaluate descendants of the group based on a hierarchy of principals to identify users that are included in the permission 330.

The DMS may thereby evaluate each permission set 345 included in the file metadata 305 for a given snapshot to generate respective permission set bitmaps 350. The DMS may utilize the permission set bitmaps 350 and corresponding principal information to aggregate policy information per permission 330, as described in further detail elsewhere herein, including with reference to FIG. 4.

Figure 4:
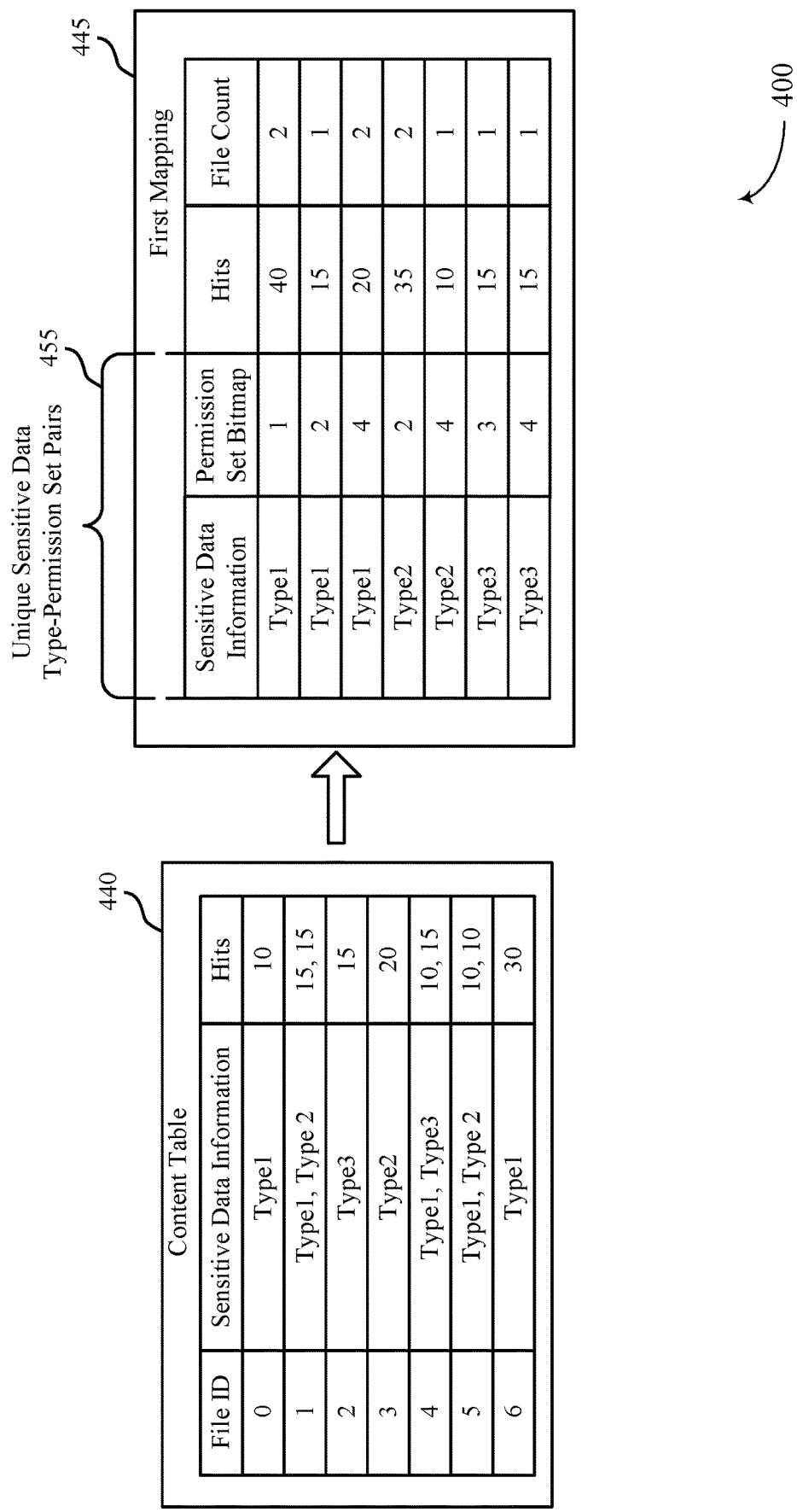
FIG. 4 shows an example of a mapping scheme that supports aggregation of policy information for principals associated with a file system in accordance with aspects of the present disclosure.

FIG. 4 shows an example of a mapping scheme 400 that supports aggregation of policy information for principals associated with a file system in accordance with aspects of the present disclosure. The mapping scheme 400 may implement or be implemented by aspects of the computing environments 100 and 200 as described with reference to FIGS. 1 and 2 and the permission evaluation scheme 300 as described with reference to FIG. 3. For example, the mapping scheme 400 illustrates a content table 440, which may represent an example of the content table 240) described with reference to FIG. 2. The content table 440) may be included in a snapshot obtained by a DMS. The DMS may utilize the content table 440 and the permission evaluation scheme 300 described with reference to FIG. 3 to generate the first mapping 445 between unique sensitive data type-permission set pairs 455 and relevant sensitive data information.

As described with reference to FIG. 3, the DMS may obtain a snapshot of a file system. The snapshot may include a set of files, file metadata for the set of files, and the content table 440, among other information. The DMS may evaluate the permission sets indicated in the file metadata to generate permission set bitmaps for each permission set, as described in further detail with reference to FIG. 3. For clarity, the permission set bitmaps are illustrated as single digit integers in FIG. 4. However, it is to be understood that the permission set bitmaps may be any values represented by any quantity of bits, as described with reference to FIG. 3. For example, the permission set bitmap 1 in FIG. 4 may represent an example of the permission set bitmap 1110011011 illustrated in FIG. 3, and so on.

The content table 440 may be included in the snapshot with the file metadata. The content table 440 may include policy information for the files in the file system. The policy information for a given file may indicate one or more types of sensitive data that are included in the file and a quantity of hits associated with each type of sensitive data. A quantity of hits (also referred to as a hit count or a weight, in some examples), may be a number that represents an amount of the sensitive data that is included in the file. The amount may be in units of bytes, data blocks, or some other storage unit. In the example of FIG. 4, the file 0 may include a first type of sensitive data (e.g., Type 1), which may be included in the file 0 10 times. The file 1 may include the first type of sensitive data and a second type of sensitive data, each of which may be included in the file 15 times. The remaining files may each include the same or different types of sensitive data and the content table 440 may indicate a hit count for each file and sensitive data type. It is to be understood that a file may include any quantity of sensitive data types and any combination of sensitive data types, including quantities and types not illustrated in FIG. 4.

To aggregate the sensitive data information per permission set, the DMS may scan the file metadata 305 and the content table 440 to identify unique sensitive data type-permission set pairs 455, which may be unique pairs of a permission set and a sensitive data type associated with the files. For example, a first unique sensitive data type-permission set pair 455 may include a first sensitive data Type 1 and a first permission set, which may be uniquely identified by a first permission set bitmap. The DMS may generate the first mapping 445, which may map the unique sensitive data type-permission set pairs 455 to corresponding hit counts and quantities of files (e.g., file counts).

The DMS may perform a sensitive information scanning operation to generate the first mapping 445. The sensitive information scanning operation may include multiple iterations. To perform each iteration, the DMS may scan the content table 440 to identify any files that include a first sensitive data type (e.g., Type 1). The DMS may scan the file metadata 305 to identify permission sets that are mapped to the files identified in the scanning of the content table 440. For example, in a first iteration, the DMS may scan the content table 440 and identify that file SIDs 0, 1, 4, 5, and 6 include sensitive data Type 1. The DMS may scan the file metadata 305 and identify that file SIDs 0, 1, 4, 5, and 6 are mapped to three different unique permission sets.

The DMS may start with a first permission set of the three identified permission sets and may generate a first unique sensitive data type-permission set pair 455 for the first permission set and the first type of sensitive data (e.g., {Type 1, bitmap 1}). The first permission set may be represented by a first bitmap (e.g., bitmap 1), which may be 1110011011, in some examples, as described with reference to FIG. 3. The DMS may determine whether an entry already exists in the first mapping 445 for the first unique sensitive data type-permission set pair 455 and may generate a new entry if not. The DMS may update a quantity of hits in the first mapping 445 based on quantities of hits identified in the content table 440 for the first unique sensitive data type-permission set pair 455. For example, the first permission set may be mapped to file SIDs 0 and 6. The DMS may scan the content table 440 to identify that there are 10 hits for the first sensitive data type in the file SID 0), and the DMS may increment the hit count in the first mapping 445 by 10 accordingly. The DMS may additionally increment a file count in the first mapping 445 by one. The DMS may subsequently identify, from the content table 440, that there are 30 hits for the first sensitive data type in the file SID 6, and the DMS may increment the hit count for the first entry by 30 accordingly. The DMS may additionally increment the file count by one for the second file that corresponds to the first unique sensitive data type-permission set pair 455. The entry for the first unique sensitive data type-permission set pair 455 in the first mapping may thereby include a total hit count of 40 and file count of two. In some examples, the quantities of hits in the content table 440 may be referred to as weights, and the quantities of hits in the first mapping 445 may be referred to as values. The DMS may increment the values in the first mapping 445 based on the relevant weights in the content table 440.

The DMS may continue to iterate through the remaining permission sets identified as being mapped to the file SIDs 0, 1, 4, 5, and 6 and may update respective entries in the first mapping accordingly. For example, an entry for the Type 1 and bitmap two pair may include 15 hits and a single file count (e.g., file SID 1). An entry for the Type 1 and bitmap 4 pair may include 20 hits and a file count of two (e.g., file SIDs 4 and 5).

Once the DMS has identified all unique sensitive data type-permission set pairs 455 that include the sensitive data Type 1, the DMS may perform a next iteration of the sensitive information scanning operation. In the next iteration, the DMS may scan the content table 440) and identify a next type of sensitive data included in a file of the content table 440. In this example, the next type may be Type2. File SIDs 1, 3, and 5 may include data of Type 2. The DMS may scan the file metadata 305 for permission sets associated with file SIDs 1, 3, and 5. File SIDs 1 and 3 may be associated with a same permission set having a second bitmap 2 (e.g., 1110000111). The DMS may generate an entry for or update an entry for the pair of Type 2 and permission set bitmap 2 in the first mapping 445. The DMS may increment the hit count with 15 hits of the Type 2 information in file SID 1 and 20 hits of the Type 2 information in file SID 3 for a total of 35 hits and a file count of two. File SID 5 may be associated with a permission set having a bitmap 4, and the DMS may generate or update an entry for the pair Type 2, bitmap 4 in the first mapping 445 to include a hit count of 10 and a file count of one.

The DMS may continue to iterate through the sensitive information scanning operation until all sensitive data types in the content table 440 are accounted for, and entries are generated for each unique sensitive data type-permission set pair 455 in the first mapping 445. It is to be understood that the DMS may iterate over sensitive data types, as described with reference to FIG. 4, or permission set bitmaps to generate the first mapping 445. For example, the DMS may scan the file metadata 305 to identify different permission set bitmaps, and the DMS may subsequently scan the content table 440 and generate a new entry or update an existing entry for each new type of sensitive data that is included in the files that are associated with the same permission set bitmap.

By iterating over permission set bitmaps and sensitive data types, the DMS may be able to aggregate policy metrics on a per-unique permission set basis. The cardinality of such an iteration may be broken down to quantity of files by quantity of unique permission sets. As described herein, the permissions may be generated by humans, and the quantity of permission sets may be relatively small. As such, the indexing operation described herein may be associated with relatively low latency and complexity as compared with indexing over all users and all files.

In some examples, the DMS may store the first mapping 445 (e.g., at the DMS or some other cloud location) as a table that maps the unique sensitive data type-permission set pairs to the respective values. Once the DMS aggregates the policy information per unique sensitive data type-permission set pair 455, the DMS may subsequently use the first mapping 445 and the permission set evaluation 325 described with reference to FIG. 3 to index the policy information per principal, as described in further detail elsewhere herein, including with reference to FIG. 5.

FIG. 5 shows an example of a mapping scheme 500 that supports aggregation of policy information for principals associated with a file system in accordance with aspects of the present disclosure. The mapping scheme 500 may implement or be implemented by aspects of the computing environments 100 and 200, the permission evaluation scheme 300, the mapping scheme 400, or any combination thereof, as described with reference to FIGS. 1-4. For example, the mapping scheme 500 illustrates policy information that has been aggregated by a DMS on a per-principal granularity using the first mapping 445 described with reference to FIG. 4 and the permission set evaluation 325 described with reference to FIG. 3.

The DMS may generate a second mapping 505 that maps principals to respective scores and file counts for sensitive data types. The respective scores may be the hit counts, which may represent an amount of sensitive data to which the principal has access. The file count may represent a quantity of files that include the type of sensitive data and that are accessible by the principal. The second mapping 505 may include at least one entry for each principal that has access to any type of sensitive data in the system. The second mapping 505 may include a different entry for each type of sensitive data to which the principal has access. For example, the principal P1 may have access to three types of sensitive data, so there may be three entries for the principal P1 in the second mapping 505, and so on. In other words, there may be an entry for each unique principal-sensitive data type pair.

To generate the second mapping 505, the DMS may identify a set of one or more permission sets that include each principal. For example, the DMS may determine that the permission set bitmaps 1, 2, and 4 include the first principal P1. The DMS may make such a determination based on the permission set evaluation 325 and the permission set bitmaps 350, as described with reference to FIG. 3. For example, a bit position associated with the first principal P1 may be set high in each of the permission set bitmaps 1, 2, and 4, which may indicate that the permission set bitmaps 1, 2, and 4 permit the first principal P1.

The DMS may then scan the first mapping 445 described with reference to FIG. 4 to identify one or more sensitive data types that are included in files associated with any of the permission set bitmaps 1, 2, and 4. These sensitive data types may be accessible by the first principal based on the first principal being able to access the corresponding files. The DMS may update an entry in the second mapping 505 for each principal and sensitive data type pair based on the scanning operation. For example, the DMS may identify that the permission set bitmap 1 is associated with 40 hits of the Type 1 data across two files (e.g., a value of 40 and a file count of two). The DMS may thereby update the P1, Type 1 entry in the second mapping 505 to include 40 hits and two files. The DMS may further identify that the permission set bitmap 2 is associated with 15 hits of the Type 1 data across a single file. The DMS may increment the P1, Type 1 entry in the second mapping 505 by 15 hits and one file, such that the respective values for this entry may be 35 hits and three files. The DMS may further identify that the permission set bitmap 4 is associated with 20 hits of the Type 1 data across two files. The DMS may increment the P1, Type 1 entry in the second mapping 505 by 20 hits and two files. The DMS may not identify any remaining permission set bitmaps associated with the Type 1 sensitive data. The total respective score for the first entry in the second mapping 505 may be 55 hits and four files, which may indicate that the principal P1 has access to 55 instances of Type 1 sensitive data across four different files.

The DMS may perform a similar scanning operation for other types of sensitive data to which the first principal has access. For example, the permission set bitmap 2 may also be associated with 35 hits of Type 2 sensitive data across two files, and the permission set bitmap 4 may be associated with 10 hits of Type 2 sensitive data across a single file. Thus, the DMS may update an entry associated with a P1, Type 2 pair in the second mapping 505 to include a score of 45 total hits and three total files. The DMS may perform a similar scanning operation until the DMS accounts for all of the types of sensitive data associated with all of the permission set bitmaps that include the first principal.

The DMS may subsequently perform a scanning operation for a second principal P2. The DMS may identify all permission set bitmaps that include the second principal, the DMS may identify all sensitive data types associated with the permission set bitmaps, and the DMS may generate and update one or more entries in the second mapping 505 for the principal P2 and the various sensitive data types based on the first mapping 445 and the permission set evaluation 325. The DMS may perform the sensitive information scanning operation until entries for all unique pairs of principals and sensitive data types are entered in the second mapping 505.

The DMS may thereby aggregate the policy information on a per-principal basis by scanning over unique permission sets. The DMS may perform a quantity of operations that is based on a quantity of principals in the system and a quantity of unique permission sets to perform this aggregation. The quantity of operations performed when indexing over permission sets may be significantly less than a quantity of operations performed by a DMS that indexes across all users and all files.

In some examples, the DMS may aggregate the policy information after obtaining the snapshot. That is, each time the DMS obtains a snapshot, the DMS may aggregate the policy information within the snapshot and may store the first mapping 445, the second mapping 505, or both. Additionally, or alternatively, in some examples, the DMS may generate the second mapping 505 for a certain principal or one or more specific principals in response to a query for security information for the principal.

Figure 6:
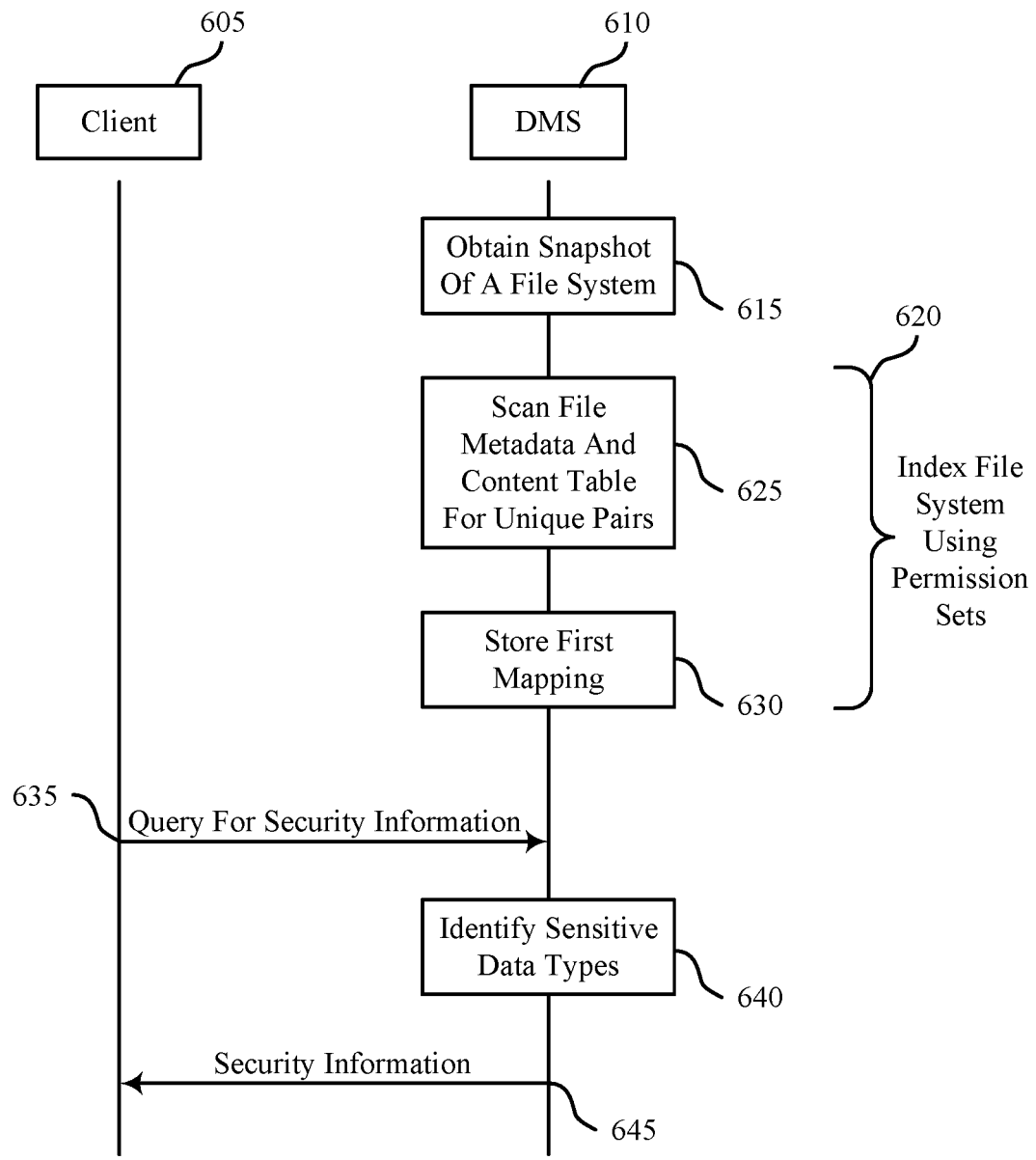
FIG. 6 shows an example of a process flow that supports aggregation of policy information for principals associated with a file system in accordance with aspects of the present disclosure.

FIG. 6 shows an example of a process flow 600 that supports aggregation of policy information for principals associated with a file system in accordance with aspects of the present disclosure. The process flow 600 may implement or may be implemented by of the computing environments 100 and 200, the permission evaluation scheme 300, the mapping scheme 400, the mapping scheme 500, or any combination thereof, as described with reference to FIGS. 1-5. For example, the process flow 600 illustrates actions taken by a DMS 610 to index a file system and obtain per-principal security information for a client 605, where the DMS 610 and the client 605 may represent examples of corresponding systems and devices as described with reference to FIGS. 1-5.

In some aspects, the operations illustrated in the process flow 600 may be performed by hardware (e.g., including circuitry, processing blocks, logic components, and other components), code (e.g., software or firmware) executed by a processor, or any combination thereof. For example, aspects of the process flow 600 may be implemented or managed by a DMS 610, a security index component, or some other software or application that is associated with data backup and recovery.

In the following description of the process flow 600, the operations by the client 605 and the DMS 610 may be performed in different orders or at different times. Some operations may also be left out of the process flow 600, or other operations may be added. Although the client 605 and the DMS 610 are shown performing the operations of the process flow 600, some aspects of some operations may also be performed by one or more other components or systems.

At 615, the DMS 610 may obtain a snapshot of a file system. The file system may be a file system that includes data for the client 605. The file system may include multiple files and file metadata for the files. As described with reference to FIGS. 2 and 3, the file metadata may include or indicate permissions associated with (e.g., assigned to) each file. An permission set may indicate, for a given file of the file system, one or more access approvals for one or more associated principals that have access to the given file in the file system. The DMS 610 may obtain the snapshot of the file system in response to a trigger or request from the client 605, in some examples. Additionally, or alternatively, the DMS 610 may obtain the snapshot of the file system periodically or based on some condition or scenario associated with the client data.

At 620, the DMS 610 may index the file system in the snapshot using the permissions. For example, the DMS 610 may utilize the file metadata including the permission information for the files of the file system to index the file system more efficiently than if the DMS 610 uses other indexing techniques, such as indexing by users and/or files. The permissions may be generated by humans (e.g., by the client 605, or by some other engineer or manager of the client 605 or the DMS 610). As such, there may be fewer permissions than there are files or principals, which is why indexing based on the permissions may reduce complexity and improve efficiency.

At 625, as part of indexing the file system, the DMS 610 may scan the file metadata and a content table included in the snapshot to identify unique pairs. A unique pair may include a combination of a respective permission set and a respective sensitive information type. A file may be associated with a respective unique pair of a first permission set and a first sensitive information type if the file is associated with the first permission set in the file metadata and includes the first sensitive information type. The unique pairs may represent examples of the unique sensitive data type-permission set pairs 455 described with reference to FIG. 4. The content table included in the snapshot may indicate which files include which types of sensitive information, as described with reference to FIG. 4.

At 630, as part of indexing the file system, the DMS 610 may store a first mapping that maps the unique pairs to respective values. A respective value for a unique pair may indicate an amount of sensitive information, of the respective sensitive information type for the unique pair, that is included in one or more files associated with the unique pair.

The respective values may be referred to as hits or hit counts in some examples. The first mapping may represent an example of the first mapping 445 described with reference to FIG. 4.

At 635, in some examples, the client 605 may transmit a query to the DMS 610. The query may request security information for a principal. For example, the query may indicate an ID of a principal and may request that the DMS 610 indicate which types of sensitive data the principal has access to.

At 640, the DMS 610 may identify a set of one or more sensitive data types included in files to which the principal has access. The DMS 610 may identify the set of one or more sensitive data types based on the first mapping and an evaluation of the permission sets. In some examples, the DMS 610 may generate a second mapping that maps the principals to respective values for one or more sensitive information types. The second mapping may represent an example of the second mapping 505 described with reference to FIG. 5. In such cases, the DMS 610 may identify the set of one or more sensitive data types by retrieving information for the principal from the second mapping. The second mapping may indicate, for a given principal, one or more types of sensitive data included in files to which the principal has access, respective values that indicate an amount of the sensitive data of each type, and quantities of file to which the principal has access that include each type of sensitive data, as described with reference to FIG. 5. The DMS 610 may generate the second mapping prior to receiving the query, or the DMS 610 may generate the second mapping after (e.g., in response to) receiving the query.

In some examples, the DMS 610 may directly identify security information for the principal in response to the query. For example, the DMS 610 may receive the query and identify a permission set that includes the principal indicated via the query. The DMS 610 may subsequently identify any sensitive information types associated with the permission set based on the first mapping. In such cases, the DMS 610 may or may not store such information in the second mapping.

At 645, the DMS 610 may output security information that indicates the respective set of sensitive data types included in the files to which the principal has access. For example, the DMS 610 may transmit, to the client 605 in response to the query, the security information for the principal(s). The DMS 610 may thereby identify per-principal security information. The client 605, the DMS 610, or both may utilize the per-principal security information to adjust one or more access permissions, move data, modify other security settings, or any combination thereof. That is, the per-principal security information may help the client 605 protect their data and ensure the data is stored securely and reliably.

Figure 7:
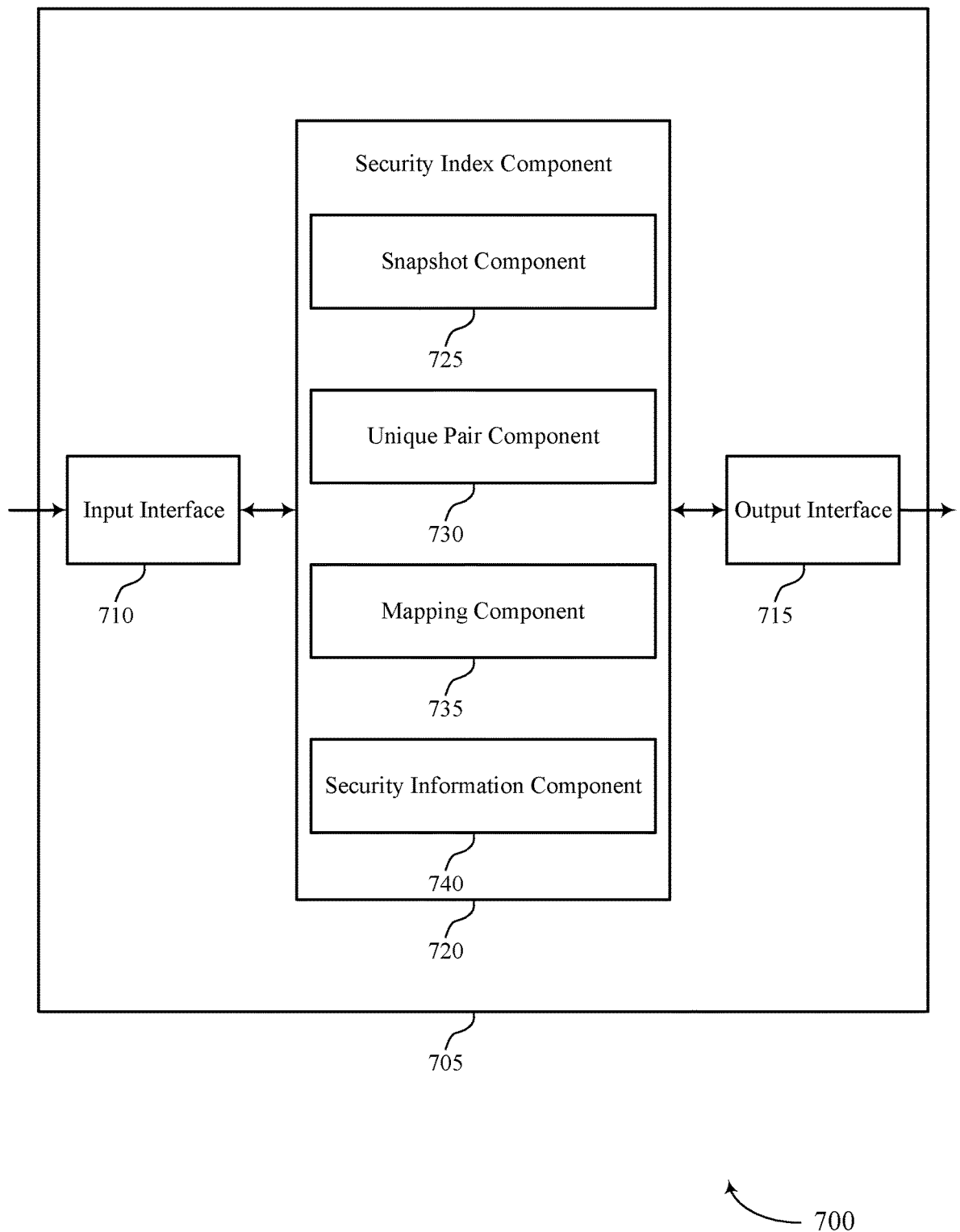
FIG. 7 shows a block diagram of an apparatus that supports aggregation of policy information for principals associated with a file system in accordance with aspects of the present disclosure.

FIG. 7 shows a block diagram 700 of a system 705 that supports aggregation of policy information for principals associated with a file system in accordance with aspects of the present disclosure. In some examples, the system 705 may be an example of aspects of one or more components described with reference to FIG. 1, such as a DMS 110. The system 705 may be an example of aspects of a DMS 110 as described herein. The system 705 may include an input interface 710, an output interface 715, and a security index component 720. The system 705 may also include one or more processors. Each of these components may be in communication with one another (e.g., via one or more buses, communications links, communications interfaces, or any combination thereof).

The input interface 710 may manage input signaling for the system 705. For example, the input interface 710 may receive input signaling (e.g., messages, packets, data, instructions, commands, or any other form of encoded information) from other systems or devices. The input interface 710 may send signaling corresponding to (e.g., representative of or otherwise based on) such input signaling to other components of the system 705 for processing. For example, the input interface 710 may transmit such corresponding signaling to the security index component 720 to support aggregation of policy information for principals associated with a file system. In some cases, the input interface 710 may be a component of a network interface 925 as described with reference to FIG. 9.

The output interface 715 may manage output signaling for the system 705. For example, the output interface 715 may receive signaling from other components of the system 705, such as the security index component 720, and may transmit such output signaling corresponding to (e.g., representative of or otherwise based on) such signaling to other systems or devices. In some cases, the output interface 715 may be a component of a network interface 925 as described with reference to FIG. 9.

The system 705, or various components thereof, may be an example of means for performing various aspects of aggregation of policy information for principals associated with a file system as described herein. For example, the security index component 720 may include a snapshot component 725, a unique pair component 730), a mapping component 735, a security information component 740, or any combination thereof. In some examples, the security index component 720, or various components thereof, may be configured to perform various operations (e.g., receiving, monitoring, transmitting) using or otherwise in cooperation with the input interface 710, the output interface 715, or both. For example, the security index component 720 may receive information from the input interface 710, send information to the output interface 715, or be integrated in combination with the input interface 710, the output interface 715, or both to receive information, transmit information, or perform various other operations as described herein.

The snapshot component 725 may be configured as or otherwise support a means for obtaining, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system. The unique pair component 730 may be configured as or otherwise support a means for scanning, by the DMS, the set of multiple files to identify unique pairs, where a unique pair includes a unique combination of a respective permission set and a respective sensitive information type, and where a file of the set of multiple files is associated with a respective unique pair based on a permission set for the file and a sensitive information type included in the file respectively matching the respective permission set for the unique pair and the respective sensitive information type for the unique pair. The mapping component 735 may be configured as or otherwise support a means for storing, by the DMS, a first mapping that maps the unique pairs to respective values, where a respective value for a unique pair is indicative of an amount of sensitive information, of the respective sensitive information type for the unique pair, that is included in one or more files associated with the unique pair. The security information component 740 may be configured as or otherwise support a means for identifying, by the DMS, based on the first mapping and an evaluation of the set of multiple permission sets, a respective set of sensitive data types included in files to which a principal from among the set of multiple principals has access.

Figure 8:
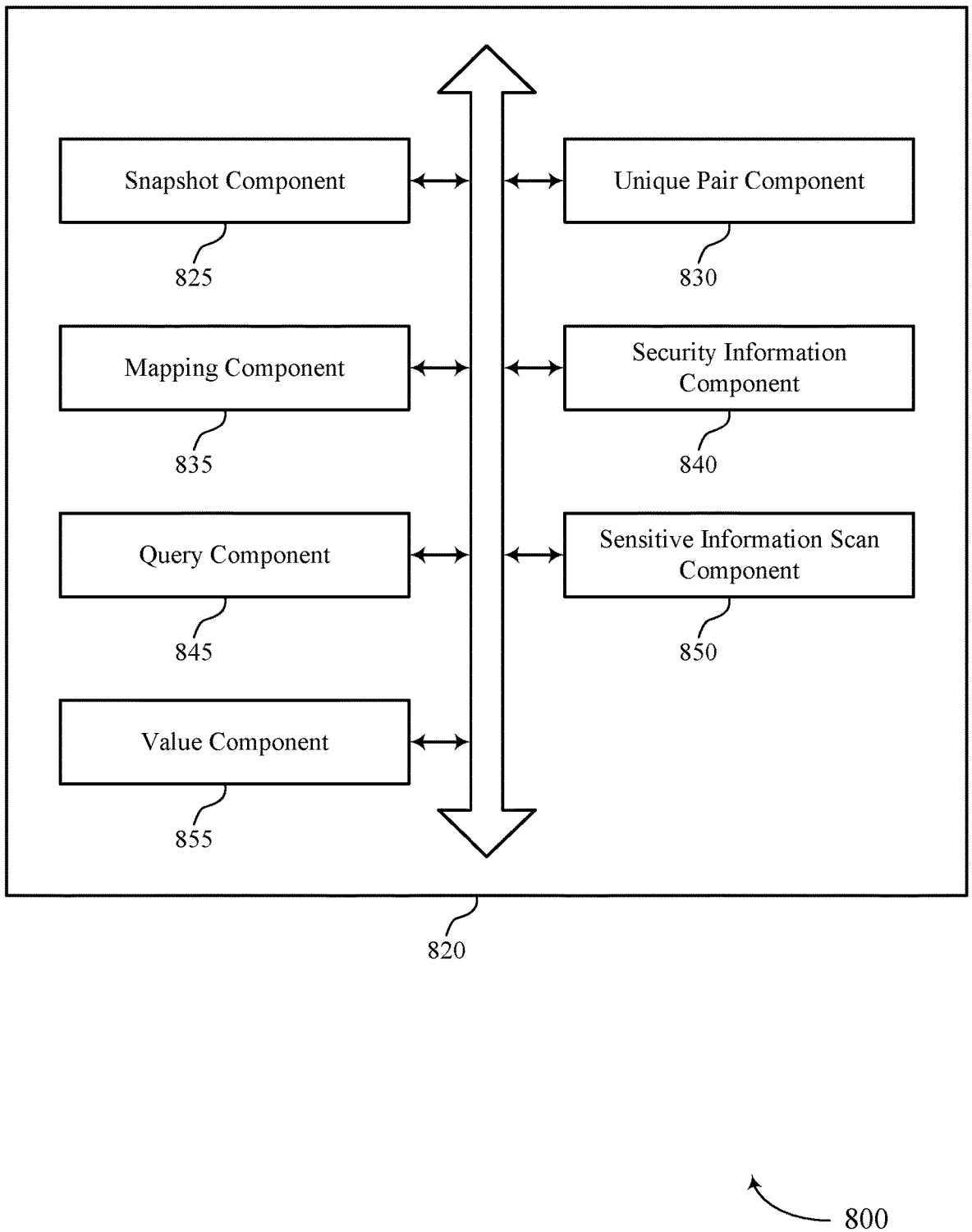
FIG. 8 shows a block diagram of a security index component that supports aggregation of policy information for principals associated with a file system in accordance with aspects of the present disclosure.

FIG. 8 shows a block diagram 800 of a security index component 820 that supports aggregation of policy information for principals associated with a file system in accordance with aspects of the present disclosure. The security index component 820 may be an example of aspects of a security index component 720 as described herein. The security index component 820, or various components thereof, may be an example of means for performing various aspects of aggregation of policy information for principals associated with a file system as described herein. For example, the security index component 820 may include a snapshot component 825, a unique pair component 830, a mapping component 835, a security information component 840, a query component 845, a sensitive information scan component 850, a value component 855, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The snapshot component 825 may be configured as or otherwise support a means for obtaining, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system. The unique pair component 830 may be configured as or otherwise support a means for scanning, by the DMS, the set of multiple files to identify unique pairs, where a unique pair includes a unique combination of a respective permission set and a respective sensitive information type, and where a file of the set of multiple files is associated with a respective unique pair based on a permission set for the file and a sensitive information type included in the file respectively matching the respective permission set for the unique pair and the respective sensitive information type for the unique pair. The mapping component 835 may be configured as or otherwise support a means for storing, by the DMS, a first mapping that maps the unique pairs to respective values, where a respective value for a unique pair is indicative of an amount of sensitive information, of the respective sensitive information type for the unique pair, that is included in one or more files associated with the unique pair. The security information component 840 may be configured as or otherwise support a means for identifying, by the DMS, based on the first mapping and an evaluation of the set of multiple permission sets, a respective set of sensitive data types included in files to which a principal from among the set of multiple principals has access.

In some examples, the query component 845 may be configured as or otherwise support a means for receiving, by the DMS, a query that requests security information for the principal, where identifying the respective set of sensitive data types occurs in response to the query. In some examples, the security information component 840 may be configured as or otherwise support a means for outputting, by the DMS, an indication of the respective set of sensitive data types included in the files to which the principal has access in response to the query.

In some examples, the sensitive information scan component 850 may be configured as or otherwise support a means for performing, by the DMS, a set of multiple iterations of a sensitive information scanning operation to generate the first mapping. In some examples, to perform an iteration of the set of multiple iterations of the sensitive information scanning operation, the sensitive information scan component 850 may be configured as or otherwise support a means for scanning a content table included in the snapshot to identify, from among the set of multiple files, a set of one or more files that include a first sensitive information type of a first unique pair, the sensitive information scan component 850 may be configured as or otherwise support a means for scanning file system metadata included in the snapshot to identify, from among the set of one or more files identified from the content table, a subset of one or more files associated with a first permission set of the first unique pair, and the value component 855 may be configured as or otherwise support a means for incrementing a value that is mapped to the unique pair via the first mapping based on respective weights included in the content table that indicate amounts of sensitive information, of the first sensitive information type, that is included in the subset of one or more files, where the value is one of the respective values included in the first mapping.

In some examples, to support performing the iteration of the set of multiple iterations of the sensitive information scanning operation, the value component 855 may be configured as or otherwise support a means for incrementing a second value that is mapped to the unique pair via the first mapping based on a quantity of files included in the subset of one or more files.

In some examples, performing the evaluation of the set of multiple permission sets includes identifying, by the DMS and from among the set of multiple principals, respective sets of one or more principals that are included in the set of multiple permission sets. In some examples, the mapping component 835 may be configured as or otherwise support a means for storing, by the DMS, a second mapping that maps the set of multiple principals to the respective values for one or more sensitive information types based on the evaluation of the set of multiple permission sets and further based on the first mapping, where identifying the respective set of sensitive data types included in the files to which the principal has access is further based on the second mapping.

In some examples, to support generating the second mapping, the unique pair component 830 may be configured as or otherwise support a means for identifying, by the DMS, based on evaluating the set of multiple permission sets, a set of one or more entries in the first mapping that are associated with a first sensitive information type and with a permission set that includes a first principal from among the set of multiple principals. In some examples, to support generating the second mapping, the sensitive information scan component 850 may be configured as or otherwise support a means for identifying, by the DMS, a second entry in the second mapping that is associated with the first principal and the first sensitive information type. In some examples, to support generating the second mapping, the value component 855 may be configured as or otherwise support a means for incrementing, by the DMS and by an amount that is based on a first value included in the set of one or more entries in the first mapping, a respective score for the first principal that is associated with the first sensitive information type, the respective score included in the second entry.

In some examples, the second mapping maps the set of multiple principals to the respective values for the one or more sensitive information types and to respective second values. In some examples, a respective value for a principal is indicative of an amount of sensitive information, of a respective sensitive information type, that is included in one or more files to which the principal has access. In some examples, a respective second value for the principal is indicative of a quantity of files including information of the respective sensitive information type to which the principal has access.

In some examples, to support storing the first mapping, the mapping component 835 may be configured as or otherwise support a means for storing, by the DMS, a table that maps the unique pairs to the respective values.

Figure 9:
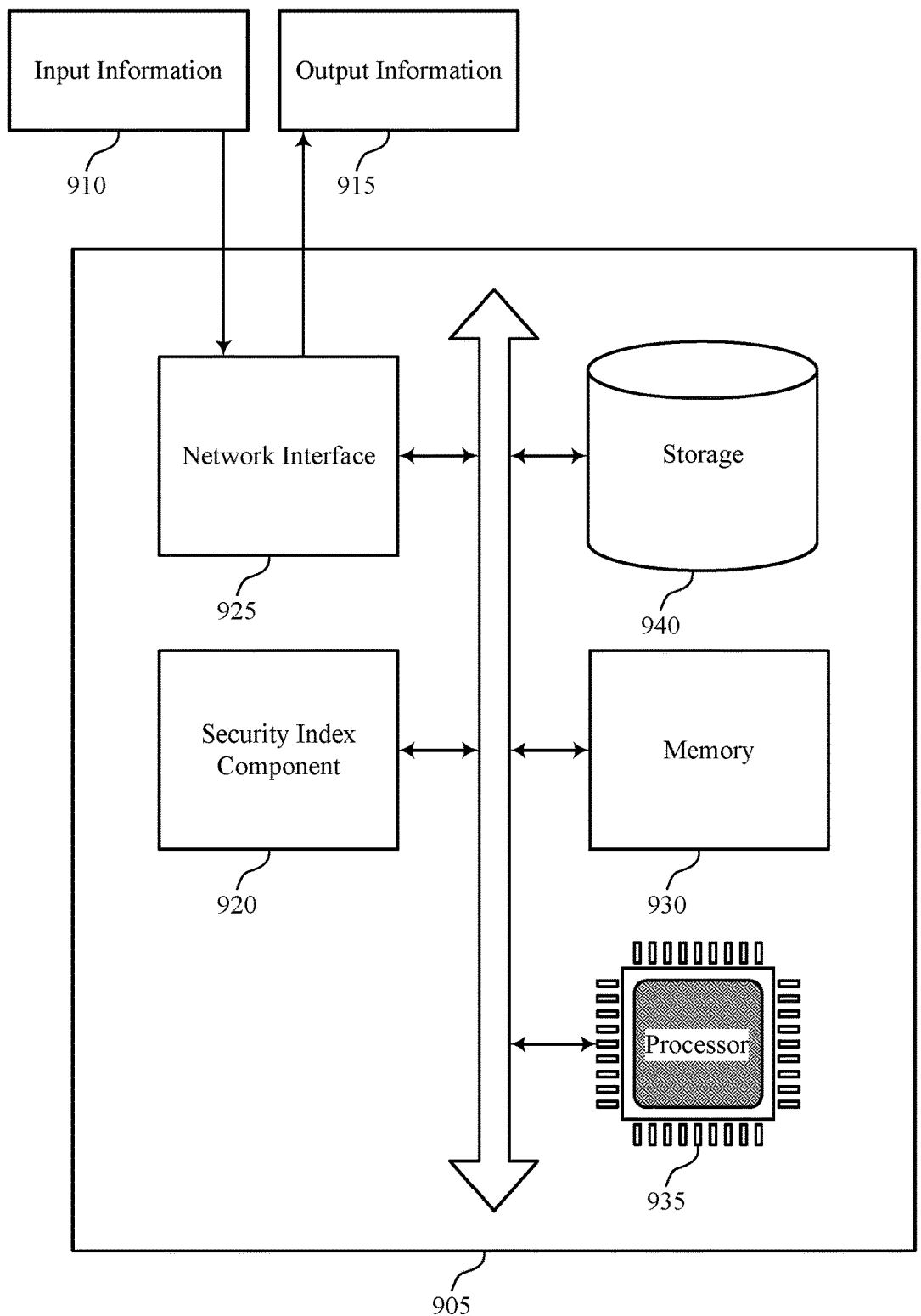
FIG. 9 shows a diagram of a system including a device that supports aggregation of policy information for principals associated with a file system in accordance with aspects of the present disclosure.

FIG. 9 shows a block diagram 900 of a system 905 that supports aggregation of policy information for principals associated with a file system in accordance with aspects of the present disclosure. The system 905 may be an example of or include the components of a system 705 or a DMS as described herein. The system 905 may include components for data management, including components such as a security index component 920, an input information 910, an output information 915, a network interface 925, at least one memory 930, at least one processor 935, and a storage 940. These components may be in electronic communication or otherwise coupled with each other (e.g., operatively, communicatively, functionally, electronically, electrically: via one or more buses, communications links, communications interfaces, or any combination thereof). Additionally, the components of the system 905 may include corresponding physical components or may be implemented as corresponding virtual components (e.g., components of one or more virtual machines). In some examples, the system 905 may be an example of aspects of one or more components described with reference to FIG. 1, such as a DMS 110.

The network interface 925 may enable the system 905 to exchange information (e.g., input information 910, output information 915, or both) with other systems or devices (not shown). For example, the network interface 925 may enable the system 905 to connect to a network (e.g., a network 120 as described herein). The network interface 925 may include one or more wireless network interfaces, one or more wired network interfaces, or any combination thereof. In some examples, the network interface 925 may be an example of may be an example of aspects of one or more components described with reference to FIG. 1, such as one or more network interfaces 165.

Memory 930 may include RAM, ROM, or both. The memory 930 may store computer-readable, computer-executable software including instructions that, when executed, cause the processor 935 to perform various functions described herein. In some cases, the memory 930 may contain, among other things, a basic input/output system (BIOS), which may control basic hardware or software operation such as the interaction with peripheral components or devices. In some cases, the memory 930 may be an example of aspects of one or more components described with reference to FIG. 1, such as one or more memories 175.

The processor 935 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 935 may be configured to execute computer-readable instructions stored in a memory 930 to perform various functions (e.g., functions or tasks supporting aggregation of policy information for principals associated with a file system). Though a single processor 935 is depicted in the example of FIG. 9, it is to be understood that the system 905 may include any quantity of one or more of processors 935 and that a group of processors 935 may collectively perform one or more functions ascribed herein to a processor, such as the processor 935. In some cases, the processor 935 may be an example of aspects of one or more components described with reference to FIG. 1, such as one or more processors 170.

Storage 940) may be configured to store data that is generated, processed, stored, or otherwise used by the system 905. In some cases, the storage 940 may include one or more HDDs, one or more SDDs, or both. In some examples, the storage 940 may be an example of a single database, a distributed database, multiple distributed databases, a data store, a data lake, or an emergency backup database. In some examples, the storage 940) may be an example of one or more components described with reference to FIG. 1, such as one or more network disks 180.

For example, the security index component 920 may be configured as or otherwise support a means for obtaining, by a DMS, a snapshot of a file system, where the file system including a set of multiple files and a set of multiple permission sets, and where the set of multiple permission sets indicate, for respective files of the set of multiple files, one or more access approvals for one or more associated principals from among a set of multiple principals associated with the file system. The security index component 920 may be configured as or otherwise support a means for scanning, by the DMS, the set of multiple files to identifying unique pairs, where a unique pair includes a unique combination of a respective permission set and a respective sensitive information type, and where a file of the set of multiple files is associated with a respective unique pair based on a permission set for the file and a sensitive information type included in the file respectively matching the respective permission set for the unique pair and the respective sensitive information type for the unique pair. The security index component 920 may be configured as or otherwise support a means for storing, by the DMS, a first mapping that maps the unique pairs to respective values, where a respective value for a unique pair is indicative of an amount of sensitive information, of the respective sensitive information type for the unique pair, that is included in one or more files associated with the unique pair. The security index component 920 may be configured as or otherwise support a means for identifying, by the DMS, based on the first mapping and an evaluation of the set of multiple permission sets, a respective set of sensitive data types included in files to which a principal from among the set of multiple principals has access.

By including or configuring the security index component 920 in accordance with examples as described herein, the system 905 may support techniques for aggregation of policy information for principals associated with a file system, which may provide one or more benefits such as, for example, improved reliability, reduced latency, improved user experience, reduced power consumption, more efficient utilization of computing resources, network resources or both, and improved security, among other possibilities.

Figure 10:
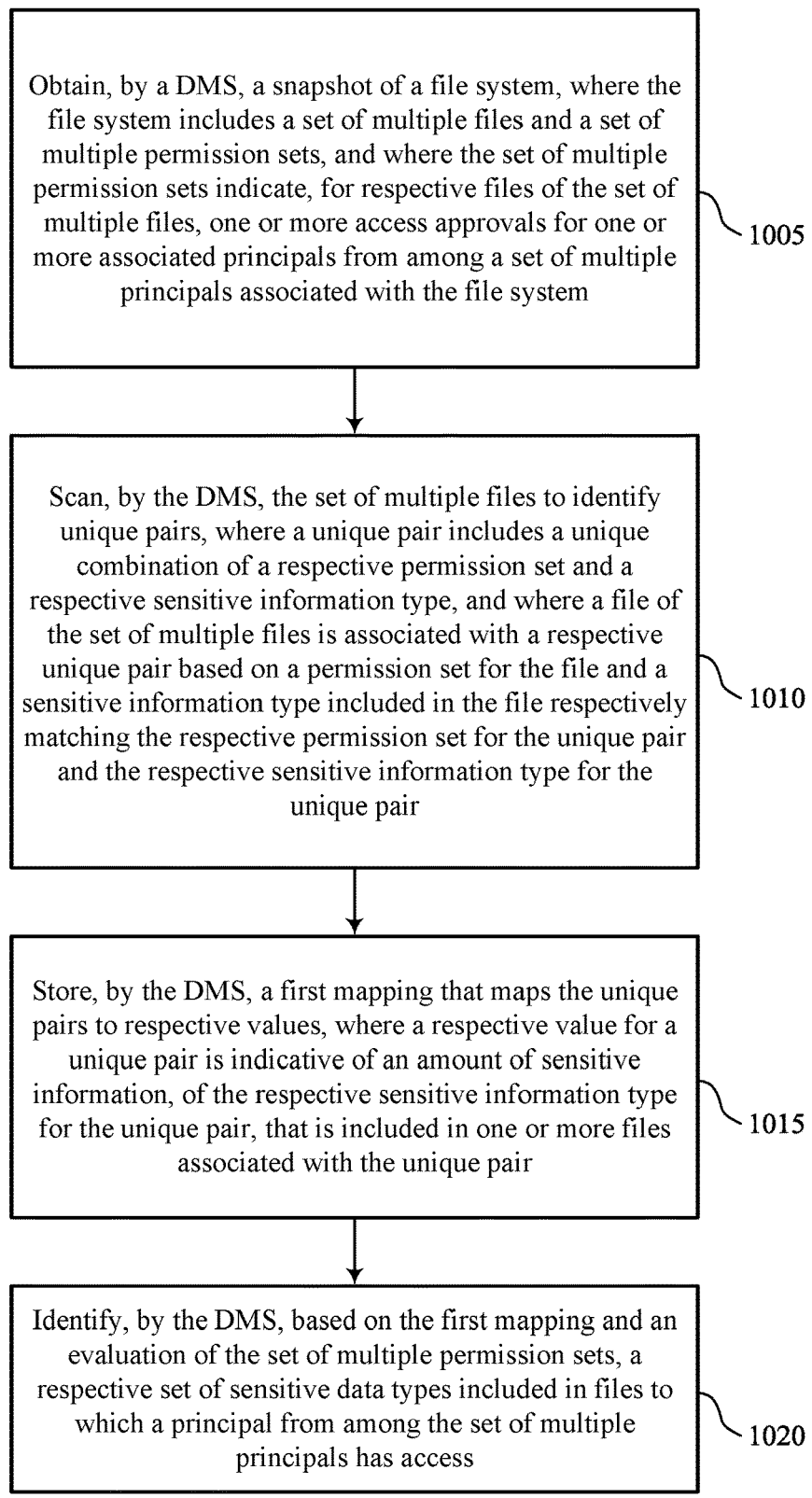
FIGS. 10 and 11 show flowcharts illustrating methods that support aggregation of policy information for principals associated with a file system in accordance with aspects of the present disclosure.

FIG. 10 shows a flowchart illustrating a method 1000 that supports aggregation of policy information for principals associated with a file system in accordance with aspects of the present disclosure. The operations of the method 1000 may be implemented by a DMS or its components as described herein. For example, the operations of the method 1000 may be performed by a DMS as described with reference to FIGS. 1 through 9. In some examples, a DMS may execute a set of instructions to control the functional elements of the DMS to perform the described functions. Additionally, or alternatively, the DMS may perform aspects of the described functions using special-purpose hardware.

At 1005, the method may include obtaining, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system. The operations of block 1005 may be performed in accordance with examples as disclosed herein. In some examples, aspects of the operations of 1005 may be performed by a snapshot component 825 as described with reference to FIG. 8.

At 1010, the method may include scanning, by the DMS, the set of multiple files to identify unique pairs, where a unique pair includes a unique combination of a respective permission set and a respective sensitive information type, and where a file of the set of multiple files is associated with a respective unique pair based on a permission set for the file and a sensitive information type included in the file respectively matching the respective permission set for the unique pair and the respective sensitive information type for the unique pair. The operations of block 1010 may be performed in accordance with examples as disclosed herein. In some examples, aspects of the operations of 1010 may be performed by a unique pair component 830 as described with reference to FIG. 8.

At 1015, the method may include storing, by the DMS, a first mapping that maps the unique pairs to respective values, where a respective value for a unique pair is indicative of an amount of sensitive information, of the respective sensitive information type for the unique pair, that is included in one or more files associated with the unique pair. The operations of block 1015 may be performed in accordance with examples as disclosed herein. In some examples, aspects of the operations of 1015 may be performed by a mapping component 835 as described with reference to FIG. 8.

At 1020, the method may include identifying, by the DMS, based on the first mapping and an evaluation of the set of multiple permission sets, a respective set of sensitive data types included in files to which a principal from among the set of multiple principals has access. The operations of block 1020 may be performed in accordance with examples as disclosed herein. In some examples, aspects of the operations of 1020 may be performed by a security information component 840) as described with reference to FIG. 8.

Figure 11:
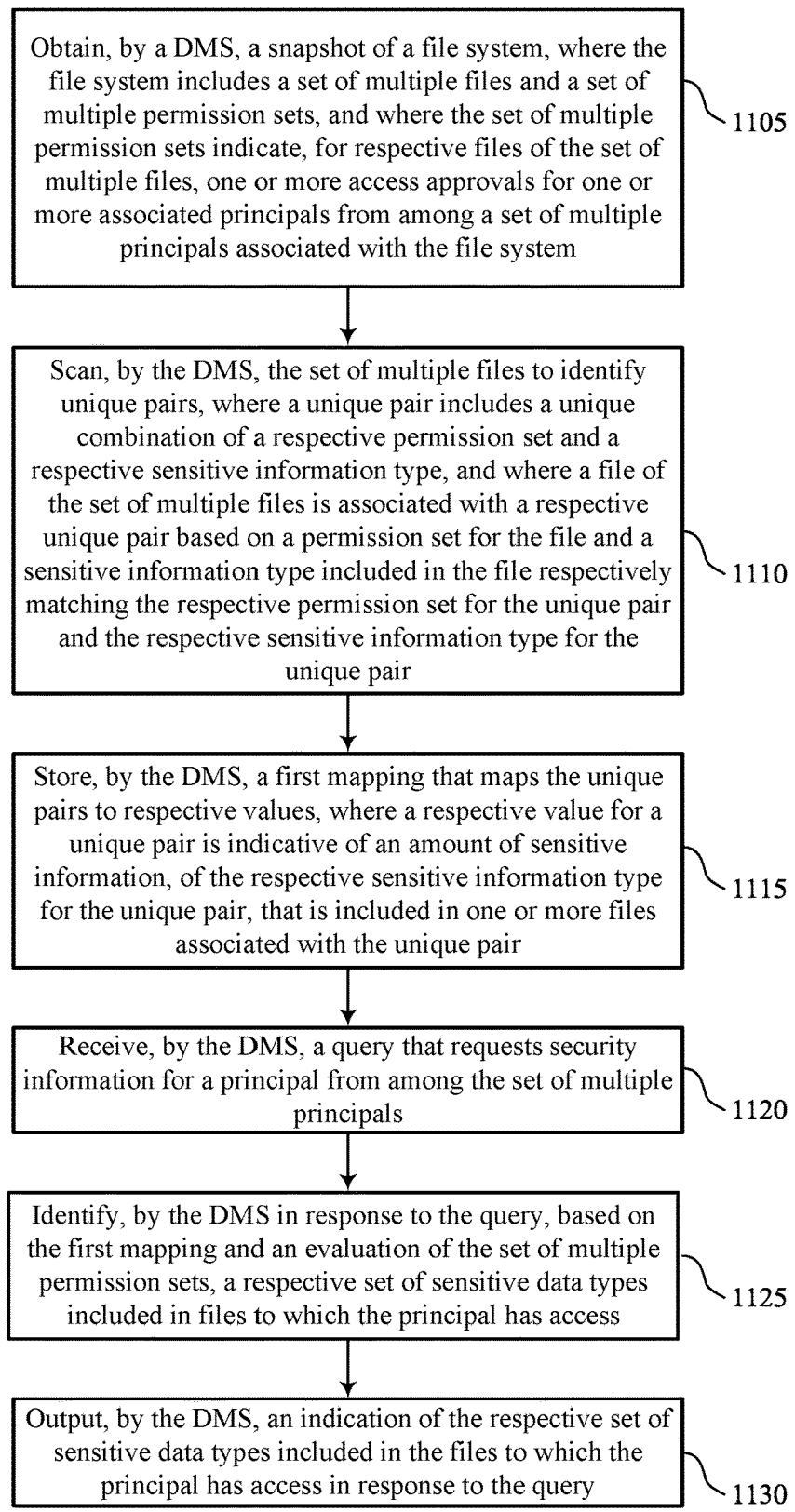

FIG. 11 shows a flowchart illustrating a method 1100 that supports aggregation of policy information for principals associated with a file system in accordance with aspects of the present disclosure. The operations of the method 1100 may be implemented by a DMS or its components as described herein. For example, the operations of the method 1100 may be performed by a DMS as described with reference to FIGS. 1 through 9. In some examples, a DMS may execute a set of instructions to control the functional elements of the DMS to perform the described functions. Additionally, or alternatively, the DMS may perform aspects of the described functions using special-purpose hardware.

At 1105, the method may include obtaining, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system. The operations of block 1105 may be performed in accordance with examples as disclosed herein. In some examples, aspects of the operations of 1105 may be performed by a snapshot component 825 as described with reference to FIG. 8.

At 1110, the method may include scanning, by the DMS, the set of multiple files to identify unique pairs, where a unique pair includes a unique combination of a respective permission set and a respective sensitive information type, and where a file of the set of multiple files is associated with a respective unique pair based on a permission set for the file and a sensitive information type included in the file respectively matching the respective permission set for the unique pair and the respective sensitive information type for the unique pair. The operations of block 1110 may be performed in accordance with examples as disclosed herein. In some examples, aspects of the operations of 1110 may be performed by a unique pair component 830 as described with reference to FIG. 8.

At 1115, the method may include storing, by the DMS, a first mapping that maps the unique pairs to respective values, where a respective value for a unique pair is indicative of an amount of sensitive information, of the respective sensitive information type for the unique pair, that is included in one or more files associated with the unique pair. The operations of block 1115 may be performed in accordance with examples as disclosed herein. In some examples, aspects of the operations of 1115 may be performed by a mapping component 835 as described with reference to FIG. 8.

At 1120, the method may include receiving, by the DMS, a query that requests security information for a principal from among the set of multiple principals. The operations of block 1120 may be performed in accordance with examples as disclosed herein. In some examples, aspects of the operations of 1120 may be performed by a query component 845 as described with reference to FIG. 8.

At 1125, the method may include identifying, by the DMS in response to the query, based on the first mapping and an evaluation of the set of multiple permission sets, a respective set of sensitive data types included in files to which the principal has access. The operations of block 1125 may be performed in accordance with examples as disclosed herein. In some examples, aspects of the operations of 1125 may be performed by a security information component 840 as described with reference to FIG. 8.

At 1130, the method may include outputting, by the DMS, an indication of the respective set of sensitive data types included in the files to which the principal has access in response to the query. The operations of block 1130 may be performed in accordance with examples as disclosed herein. In some examples, aspects of the operations of 1130 may be performed by a security information component 840 as described with reference to FIG. 8.

A method by an apparatus is described. The method may include obtaining, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system, scanning, by the DMS, the set of multiple files to identify unique pairs, where a unique pair includes a unique combination of a respective permission set and a respective sensitive information type, and where a file of the set of multiple files is associated with a respective unique pair based on a permission set for the file and a sensitive information type included in the file respectively matching the respective permission set for the unique pair and the respective sensitive information type for the unique pair, storing, by the DMS, a first mapping that maps the unique pairs to respective values, where a respective value for a unique pair is indicative of an amount of sensitive information, of the respective sensitive information type for the unique pair, that is included in one or more files associated with the unique pair, and identifying, by the DMS, based on the first mapping and an evaluation of the set of multiple permission sets, a respective set of sensitive data types included in files to which a principal from among the set of multiple principals has access.

An apparatus is described. The apparatus may include one or more memories storing processor executable code, and one or more processors coupled with the one or more memories. The one or more processors may individually or collectively operable to execute the code to cause the apparatus to obtain, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system, scan, by the DMS, the set of multiple files to identify unique pairs, where a unique pair includes a unique combination of a respective permission set and a respective sensitive information type, and where a file of the set of multiple files is associated with a respective unique pair based on a permission set for the file and a sensitive information type included in the file respectively matching the respective permission set for the unique pair and the respective sensitive information type for the unique pair, store, by the DMS, a first mapping that maps the unique pairs to respective values, where a respective value for a unique pair is indicative of an amount of sensitive information, of the respective sensitive information type for the unique pair, that is included in one or more files associated with the unique pair, and identify, by the DMS, based on the first mapping and an evaluation of the set of multiple permission sets, a respective set of sensitive data types included in files to which a principal from among the set of multiple principals has access.

Another apparatus is described. The apparatus may include means for obtaining, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system, means for scanning, by the DMS, the set of multiple files to identify unique pairs, where a unique pair includes a unique combination of a respective permission set and a respective sensitive information type, and where a file of the set of multiple files is associated with a respective unique pair based on a permission set for the file and a sensitive information type included in the file respectively matching the respective permission set for the unique pair and the respective sensitive information type for the unique pair, means for storing, by the DMS, a first mapping that maps the unique pairs to respective values, where a respective value for a unique pair is indicative of an amount of sensitive information, of the respective sensitive information type for the unique pair, that is included in one or more files associated with the unique pair, and means for identifying, by the DMS, based on the first mapping and an evaluation of the set of multiple permission sets, a respective set of sensitive data types included in files to which a principal from among the set of multiple principals has access.

A non-transitory computer-readable medium storing code is described. The code may include instructions executable by a processor to obtain, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system, scan, by the DMS, the set of multiple files to identify unique pairs, where a unique pair includes a unique combination of a respective permission set and a respective sensitive information type, and where a file of the set of multiple files is associated with a respective unique pair based on a permission set for the file and a sensitive information type included in the file respectively matching the respective permission set for the unique pair and the respective sensitive information type for the unique pair, store, by the DMS, a first mapping that maps the unique pairs to respective values, where a respective value for a unique pair is indicative of an amount of sensitive information, of the respective sensitive information type for the unique pair, that is included in one or more files associated with the unique pair, and identify, by the DMS, based on the first mapping and an evaluation of the set of multiple permission sets, a respective set of sensitive data types included in files to which a principal from among the set of multiple principals has access.

Some examples of the method, apparatus, and non-transitory computer-readable medium described herein may further include operations, features, means, or instructions for receiving, by the DMS, a query that requests security information for the principal, where identifying the respective set of sensitive data types occurs in response to the query and outputting, by the DMS, an indication of the respective set of sensitive data types included in the files to which the principal may have access in response to the query.

Some examples of the method, apparatus, and non-transitory computer-readable medium described herein may further include operations, features, means, or instructions for performing, by the DMS, a set of multiple iterations of a sensitive information scanning operation to generate the first mapping, where performing an iteration of the set of multiple iterations of the sensitive information scanning operation includes scanning a content table included in the snapshot to identify, from among the set of multiple files, a set of one or more files that include a first sensitive information type of a first unique pair, scanning file system metadata included in the snapshot to identify, from among the set of one or more files identified from the content table, a subset of one or more files associated with a first permission set of the first unique pair, and incrementing a value that may be mapped to the unique pair via the first mapping based on respective weights included in the content table that indicate amounts of sensitive information, of the first sensitive information type, that may be included in the subset of one or more files, where the value may be one of the respective values included in the first mapping.

In some examples of the method, apparatus, and non-transitory computer-readable medium described herein, performing the iteration of the set of multiple iterations of the sensitive information scanning operation may include operations, features, means, or instructions for incrementing a second value that may be mapped to the unique pair via the first mapping based on a quantity of files included in the subset of one or more files.

In some examples, performing the evaluation of the set of multiple permission sets includes identifying, by the DMS and from among the set of multiple principals, respective sets of one or more principals that may be included in the set of multiple permission sets, and some examples of the method, apparatus, and non-transitory computer-readable medium further include operations, features, means, or instructions for storing, by the DMS, a second mapping that maps the set of multiple principals to the respective values for one or more sensitive information types based on the evaluation of the set of multiple permission sets and further based on the first mapping, where identifying the respective set of sensitive data types included in the files to which the principal may have access may be further based on the second mapping.

In some examples of the method, apparatus, and non-transitory computer-readable medium described herein, generating the second mapping may include operations, features, means, or instructions for identifying, by the DMS, based on evaluating the set of multiple permission sets, a set of one or more entries in the first mapping that may be associated with a first sensitive information type and with a permission set that includes a first principal from among the set of multiple principals, identifying, by the DMS, a second entry in the second mapping that may be associated with the first principal and the first sensitive information type, and incrementing, by the DMS and by an amount that may be based on a first value included in the set of one or more entries in the first mapping, a respective score for the first principal that may be associated with the first sensitive information type, the respective score included in the second entry.

In some examples of the method, apparatus, and non-transitory computer-readable medium described herein, the second mapping maps the set of multiple principals to the respective values for the one or more sensitive information types and to respective second values, a respective value for a principal may be indicative of an amount of sensitive information, of a respective sensitive information type, that may be included in one or more files to which the principal may have access, and a respective second value for the principal may be indicative of a quantity of files including information of the respective sensitive information type to which the principal may have access.

In some examples of the method, apparatus, and non-transitory computer-readable medium described herein, storing the first mapping may include operations, features, means, or instructions for storing, by the DMS, a table that maps the unique pairs to the respective values.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary." used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   obtaining, by a data management system, a snapshot of a file system, wherein the file system comprises a plurality of files and a plurality of permission sets, and wherein the plurality of permission sets indicate, for respective files of the plurality of files, one or more access approvals for one or more associated principals from among a plurality of principals associated with the file system;
   scanning, by the data management system, the plurality of files to identify unique pairs, wherein a unique pair comprises a unique combination of a respective permission set and a respective sensitive information type, and wherein a file of the plurality of files is associated with a respective unique pair based at least in part on a permission set for the file and a sensitive information type included in the file respectively matching the respective permission set for the unique pair and the respective sensitive information type for the unique pair;
   storing, by the data management system, a first mapping that maps the unique pairs to respective values, wherein a respective value for a unique pair is indicative of an amount of sensitive information, of the respective sensitive information type for the unique pair, that is included in one or more files associated with the unique pair; and
   identifying, by the data management system, based at least in part on the first mapping and an evaluation of the plurality of permission sets, a respective set of sensitive data types included in files to which a principal from among the plurality of principals has access.

2. The method of claim 1, further comprising:
   receiving, by the data management system, a query that requests security information for the principal, wherein identifying the respective set of sensitive data types occurs in response to the query; and
   outputting, by the data management system, an indication of the respective set of sensitive data types included in the files to which the principal has access in response to the query.

3. The method of claim 1, further comprising:
   performing, by the data management system, a plurality of iterations of a sensitive information scanning operation to generate the first mapping, wherein performing an iteration of the plurality of iterations of the sensitive information scanning operation comprises:
   scanning a content table included in the snapshot to identify, from among the plurality of files, a set of one or more files that include a first sensitive information type of a first unique pair;
   scanning file system metadata included in the snapshot to identify, from among the set of one or more files identified from the content table, a subset of one or more files associated with a first permission set of the first unique pair; and
   incrementing a value that is mapped to the unique pair via the first mapping based at least in part on respective weights included in the content table that indicate amounts of sensitive information, of the first sensitive information type, that is included in the subset of one or more files, wherein the value is one of the respective values included in the first mapping.

4. The method of claim 3, wherein performing the iteration of the plurality of iterations of the sensitive information scanning operation further comprises:
   incrementing a second value that is mapped to the unique pair via the first mapping based at least in part on a quantity of files included in the subset of one or more files.

5. The method of claim 1, wherein:
   performing the evaluation of the plurality of permission sets comprises identifying, by the data management system and from among the plurality of principals, respective sets of one or more principals that are included in the plurality of permission sets; and
   the method further comprises storing, by the data management system, a second mapping that maps the plurality of principals to the respective values for one or more sensitive information types based at least in part on the evaluation of the plurality of permission sets and further based at least in part on the first mapping, wherein identifying the respective set of sensitive data types included in the files to which the principal has access is further based at least in part on the second mapping.

6. The method of claim 5, wherein generating the second mapping comprises:
identifying, by the data management system, based at least in part on evaluating the plurality of permission sets, a set of one or more entries in the first mapping that are associated with a first sensitive information type and with a permission set that includes a first principal from among the plurality of principals;
identifying, by the data management system, a second entry in the second mapping that is associated with the first principal and the first sensitive information type; and
incrementing, by the data management system and by an amount that is based at least in part on a first value included in the set of one or more entries in the first mapping, a respective score for the first principal that is associated with the first sensitive information type, the respective score included in the second entry.

7. The method of claim 5, wherein:
the second mapping maps the plurality of principals to the respective values for the one or more sensitive information types and to respective second values;
a respective value for a principal is indicative of an amount of sensitive information, of a respective sensitive information type, that is included in one or more files to which the principal has access; and
a respective second value for the principal is indicative of a quantity of files including information of the respective sensitive information type to which the principal has access.

8. The method of claim 1, wherein storing the first mapping comprises:
storing, by the data management system, a table that maps the unique pairs to the respective values.

9. An apparatus, comprising:
one or more memories storing processor-executable code; and
one or more processors coupled with the one or more memories and individually or collectively operable to execute the code to cause the apparatus to:
obtain, by a data management system, a snapshot of a file system, wherein the file system comprises a plurality of files and a plurality of permission sets, and wherein the plurality of permission sets indicate, for respective files of the plurality of files, one or more access approvals for one or more associated principals from among a plurality of principals associated with the file system;
scan, by the data management system, the plurality of files to identify unique pairs, wherein a unique pair comprises a unique combination of a respective permission set and a respective sensitive information type, and wherein a file of the plurality of files is associated with a respective unique pair based at least in part on an access control list set for the file and a sensitive information type included in the file respectively matching the respective permission set for the unique pair and the respective sensitive information type for the unique pair;
store, by the data management system, a first mapping that maps the unique pairs to respective values, wherein a respective value for a unique pair is indicative of an amount of sensitive information, of the respective sensitive information type for the unique pair, that is included in one or more files associated with the unique pair; and
identify, by the data management system, based at least in part on the first mapping and an evaluation of the plurality of permission sets, a respective set of sensitive data types included in files to which a principal from among the plurality of principals has access.

10. The apparatus of claim 9, wherein the one or more processors are individually or collectively further operable to execute the code to cause the apparatus to:
receive, by the data management system, a query that requests security information for the principal, wherein identifying the respective set of sensitive data types occurs in response to the query; and
output, by the data management system, an indication of the respective set of sensitive data types included in the files to which the principal has access in response to the query.

11. The apparatus of claim 9, wherein the one or more processors are individually or collectively further operable to execute the code to cause the apparatus to:
perform, by the data management system, a plurality of iterations of a sensitive information scanning operation to generate the first mapping, wherein, to perform an iteration of the plurality of iterations of the sensitive information scanning operation, the one or more processors are individually or collectively operable to execute the code to cause the apparatus to:
scan a content table included in the snapshot to identify, from among the plurality of files, a set of one or more files that include a first sensitive information type of a first unique pair;
scan file system metadata included in the snapshot to identify, from among the set of one or more files identified from the content table, a subset of one or more files associated with a first permission set of the first unique pair; and
increment a value that is mapped to the unique pair via the first mapping based at least in part on respective weights included in the content table that indicate amounts of sensitive information, of the first sensitive information type, that is included in the subset of one or more files, wherein the value is one of the respective values included in the first mapping.

12. The apparatus of claim 11, wherein, to perform the iteration of the plurality of iterations of the sensitive information scanning operation, the one or more processors are individually or collectively further operable to execute the code to cause the apparatus to:
increment a second value that is mapped to the unique pair via the first mapping based at least in part on a quantity of files included in the subset of one or more files.

13. The apparatus of claim 9, wherein:
performing the evaluation of the plurality of permission sets comprises identifying, by the data management system and from among the plurality of principals, respective sets of one or more principals that are included in the plurality of permission sets; and
the one or more processors are individually or collectively further operable to execute the code to cause the apparatus to store, by the data management system, a second mapping that maps the plurality of principals to the respective values for one or more sensitive information types based at least in part on the evaluation of the plurality of permission sets and further based at least in part on the first mapping, wherein identifying the respective set of sensitive data types included in the files to which the principal has access is further based at least in part on the second mapping.

14. The apparatus of claim 13, wherein, to generate the second mapping, the one or more processors are individually or collectively operable to execute the code to cause the apparatus to:

identify, by the data management system, based at least in part on evaluating the plurality of permission sets, a set of one or more entries in the first mapping that are associated with a first sensitive information type and with a permission set that includes a first principal from among the plurality of principals;

identify, by the data management system, a second entry in the second mapping that is associated with the first principal and the first sensitive information type; and increment, by the data management system and by an amount that is based at least in part on a first value included in the set of one or more entries in the first mapping, a respective score for the first principal that is associated with the first sensitive information type, the respective score included in the second entry.

15. The apparatus of claim 13, wherein:

the second mapping maps the plurality of principals to the respective values for the one or more sensitive information types and to respective second values;

a respective value for a principal is indicative of an amount of sensitive information, of a respective sensitive information type, that is included in one or more files to which the principal has access; and a respective second value for the principal is indicative of a quantity of files including information of the respective sensitive information type to which the principal has access.

16. The apparatus of claim 9, wherein, to store the first mapping, the one or more processors are individually or collectively operable to execute the code to cause the apparatus to:

store, by the data management system, a table that maps the unique pairs to the respective values.

17. A non-transitory computer-readable medium storing code, the code comprising instructions executable by one or more processors to:

obtain, by a data management system, a snapshot of a file system, wherein the file system comprises a plurality of files and a plurality of permission sets, and wherein the plurality of permission sets indicate, for respective files of the plurality of files, one or more access approvals for one or more associated principals from among a plurality of principals associated with the file system;

scan, by the data management system, the plurality of files to identify unique pairs, wherein a unique pair comprises a unique combination of a respective permission set and a respective sensitive information type, and wherein a file of the plurality of files is associated with a respective unique pair based at least in part on a permission set for the file and a sensitive information type included in the file respectively matching the respective permission set for the unique pair and the respective sensitive information type for the unique pair;

store, by the data management system, a first mapping that maps the unique pairs to respective values, wherein a respective value for a unique pair is indicative of an amount of sensitive information, of the respective sensitive information type for the unique pair, that is included in one or more files associated with the unique pair; and identify, by the data management system, based at least in part on the first mapping and an evaluation of the plurality of permission sets, a respective set of sensitive data types included in files to which a principal from among the plurality of principals has access.

18. The non-transitory computer-readable medium of claim 17, wherein the instructions are further executable by the one or more processors to:

receive, by the data management system, a query that requests security information for the principal, wherein identifying the respective set of sensitive data types occurs in response to the query; and output, by the data management system, an indication of the respective set of sensitive data types included in the files to which the principal has access in response to the query.

19. The non-transitory computer-readable medium of claim 17, wherein the instructions are further executable by the one or more processors to:

perform, by the data management system, a plurality of iterations of a sensitive information scanning operation to generate the first mapping, wherein, to perform an iteration of the plurality of iterations of the sensitive information scanning operation, the instructions are executable by the one or more processors to:

scan a content table included in the snapshot to identify, from among the plurality of files, a set of one or more files that include a first sensitive information type of a first unique pair;

scan file system metadata included in the snapshot to identify, from among the set of one or more files identified from the content table, a subset of one or more files associated with a first permission set of the first unique pair; and increment a value that is mapped to the unique pair via the first mapping based at least in part on respective weights included in the content table that indicate amounts of sensitive information, of the first sensitive information type, that is included in the subset of one or more files, wherein the value is one of the respective values included in the first mapping.

20. The non-transitory computer-readable medium of claim 19, wherein, to perform the iteration of the plurality of iterations of the sensitive information scanning operation, the instructions are executable by the one or more processors to:

increment a second value that is mapped to the unique pair via the first mapping based at least in part on a quantity of files included in the subset of one or more files.

* * * * *